United States Patent
Baumgarte et al.

(10) Patent No.: US 7,644,003 B2
(45) Date of Patent: Jan. 5, 2010

(54) CUE-BASED AUDIO CODING/DECODING

(75) Inventors: Frank Baumgarte, Sunnyvale, CA (US); Jiashu Chen, Basking Ridge, NJ (US); Christof Faller, Tagerwilen (CH)

(73) Assignee: Agere Systems Inc., Allentown, PA (US)

( * ) Notice: Subject to any disclaimer, the term of this patent is extended or adjusted under 35 U.S.C. 154(b) by 1211 days.

(21) Appl. No.: 10/936,464

(22) Filed: Sep. 8, 2004

(65) Prior Publication Data

US 2005/0058304 A1    Mar. 17, 2005

Related U.S. Application Data

(63) Continuation-in-part of application No. 09/848,877, filed on May 4, 2001, now Pat. No. 7,116,787, and a continuation-in-part of application No. 10/045,458, filed on Nov. 7, 2001, now abandoned, and a continuation-in-part of application No. 10/155,437, filed on May 24, 2002, now Pat. No. 7,006,636, and a continuation-in-part of application No. 10/246,570, filed on Sep. 18, 2002, now Pat. No. 7,292,901, and a continuation-in-part of application No. 10/815,591, filed on Apr. 1, 2004.

(60) Provisional application No. 60/585,703, filed on Jul. 6, 2004, provisional application No. 60/311,565, filed on Aug. 10, 2001, provisional application No. 60/391,095, filed on Jun. 24, 2002, provisional application No. 60/544,287, filed on Feb. 12, 2004.

(51) Int. Cl.
G10L 11/04 (2006.01)
G10L 19/00 (2006.01)
G10L 21/00 (2006.01)
H04R 5/00 (2006.01)
H04B 14/04 (2006.01)

(52) U.S. Cl. ............... 704/501; 704/201; 704/206; 704/230; 381/18; 381/23; 375/242

(58) Field of Classification Search ................ 704/206, 704/230, 501
See application file for complete search history.

(56) References Cited

U.S. PATENT DOCUMENTS 4,236,039 A    11/1980  Cooper ............... 381/23

(Continued)

FOREIGN PATENT DOCUMENTS

CN    1295778    5/2001

(Continued)

OTHER PUBLICATIONS

"*Final text for DIS 11172-1 (rev. 2): Information Technology-Coding of Moving Pictures and Associated Audio for Digital Storage Media-Part 1*," ISO/IEC JTC I/SC 29 N 147, Apr. 20, 1992, Section 3: Audio, XP-002083108, 2 pages.

(Continued)

*Primary Examiner*—David R Hudspeth
*Assistant Examiner*—Justin W Rider
(74) *Attorney, Agent, or Firm*—Mendelsohn, Drucker & Associates, P.C.; Steve Mendelsohn

(57) ABSTRACT

Generic and specific C-to-E binaural cue coding (BCC) schemes are described, including those in which one or more of the input channels are transmitted as unmodified channels that are not downmixed at the BCC encoder and not upmixed at the BCC decoder. The specific BCC schemes described include 5-to-2, 6-to-5, 7-to-5, 6.1-to-5.1, 7.1-to-5.1, and 6.2-to-5.1, where "0.1" indicates a single low-frequency effects (LFE) channel and "0.2" indicates two LFE channels.

56 Claims, 10 Drawing Sheets

U.S. PATENT DOCUMENTS

| | | | | |
|---|---|---|---|---|
| 4,815,132 | A | | 3/1989 | Minami .......................... 381/1 |
| 4,972,484 | A | | 11/1990 | Theile et al. ............. 704/200.1 |
| 5,371,799 | A | | 12/1994 | Lowe et al. .................... 381/25 |
| 5,463,424 | A | | 10/1995 | Dressler ..................... 348/485 |
| 5,579,430 | A | | 11/1996 | Grill et al. .................. 395/2.12 |
| 5,583,962 | A | | 12/1996 | Davis et al. ................ 395/2.38 |
| 5,682,461 | A | | 10/1997 | Silzle et al. ................ 395/2.14 |
| 5,701,346 | A | * | 12/1997 | Herre et al. ..................... 381/18 |
| 5,703,999 | A | | 12/1997 | Herre et al. ................ 395/2.12 |
| 5,706,309 | A | | 1/1998 | Eberlein et al. ............. 375/260 |
| 5,771,295 | A | | 6/1998 | Waller, Jr. ..................... 381/18 |
| 5,812,971 | A | | 9/1998 | Herre .......................... 704/230 |
| 5,825,776 | A | | 10/1998 | Moon .......................... 370/430 |
| 5,860,060 | A | * | 1/1999 | Li et al. ....................... 704/500 |
| 5,878,080 | A | | 3/1999 | Ten Kate ..................... 375/241 |
| 5,889,843 | A | | 3/1999 | Singer et al. ........... 379/202.01 |
| 5,890,125 | A | | 3/1999 | Davis et al. ................. 704/501 |
| 5,912,976 | A | | 6/1999 | Klayman et al. .............. 381/18 |
| 5,930,733 | A | | 7/1999 | Park et al. ..................... 702/76 |
| 5,946,352 | A | * | 8/1999 | Rowlands et al. ........... 375/242 |
| 5,956,674 | A | * | 9/1999 | Smyth et al. ............. 704/200.1 |
| 6,016,473 | A | | 1/2000 | Dolby ......................... 704/500 |
| 6,021,386 | A | | 2/2000 | Davis et al. ................. 704/229 |
| 6,021,389 | A | | 2/2000 | Protopapas ................. 704/278 |
| 6,108,584 | A | | 8/2000 | Edwards ....................... 700/94 |
| 6,111,958 | A | | 8/2000 | Maher .......................... 381/17 |
| 6,131,084 | A | | 10/2000 | Hardwick .................. 704/230 |
| 6,205,430 | B1 | * | 3/2001 | Hui ............................ 704/500 |
| 6,236,731 | B1 | | 5/2001 | Brennan et al. ............. 381/316 |
| 6,282,631 | B1 | * | 8/2001 | Arbel ............................ 712/35 |
| 6,356,870 | B1 | * | 3/2002 | Hui et al. ..................... 704/500 |
| 6,408,327 | B1 | | 6/2002 | McClennon et al. ........ 709/204 |
| 6,424,939 | B1 | | 7/2002 | Herre et al. ................. 704/219 |
| 6,434,191 | B1 | | 8/2002 | Agrawal et al. ............. 375/227 |
| 6,539,357 | B1 | | 3/2003 | Sinha ........................ 704/270.1 |
| 6,614,936 | B1 | | 9/2003 | Wu et al. ..................... 382/238 |
| 6,658,117 | B2 | | 12/2003 | Hasebe ......................... 381/61 |
| 6,763,115 | B1 | | 7/2004 | Kobayashi .................. 381/309 |
| 6,782,366 | B1 | * | 8/2004 | Huang et al. ................. 704/500 |
| 6,823,018 | B1 | | 11/2004 | Jafarkhani et al. .......... 375/245 |
| 6,845,163 | B1 | | 1/2005 | Johnston et al. ............... 381/92 |
| 6,850,496 | B1 | | 2/2005 | Knappe et al. .............. 370/260 |
| 6,934,676 | B2 | | 8/2005 | Wang et al. ............. 704/200.1 |
| 6,940,540 | B2 | | 9/2005 | Beal et al. ................... 348/169 |
| 6,973,184 | B1 | | 12/2005 | Shaffer et al. .......... 379/420.01 |
| 7,116,787 | B2 | | 10/2006 | Faller ........................... 381/17 |
| 7,382,886 | B2 | | 6/2008 | Henn et al. ................... 381/23 |
| 7,516,066 | B2 | | 4/2009 | Schuijers et al. ............ 704/219 |
| 2001/0031054 | A1 | * | 10/2001 | Grimani ...................... 381/98 |
| 2002/0055796 | A1 | | 5/2002 | Katayama et al. ............. 700/94 |
| 2003/0035553 | A1 | | 2/2003 | Baumgarte et al. ......... 381/94.2 |
| 2003/0081115 | A1 | | 5/2003 | Curry et al. ............... 348/14.12 |
| 2003/0161479 | A1 | | 8/2003 | Yang et al. .................... 381/22 |
| 2003/0187663 | A1 | | 10/2003 | Truman et al. .............. 704/500 |
| 2003/0219130 | A1 | | 11/2003 | Baumgarte et al. ........... 381/18 |
| 2003/0236583 | A1 | | 12/2003 | Baumgarte et al. ............ 700/94 |
| 2004/0091118 | A1 | | 5/2004 | Griesinger ................... 381/20 |
| 2005/0053242 | A1 | | 3/2005 | Henn et al. ................... 381/22 |
| 2005/0069143 | A1 | | 3/2005 | Budnikov et al. ............. 381/63 |
| 2005/0157883 | A1 | | 7/2005 | Herre et al. ................... 381/17 |
| 2005/0226426 | A1 | | 10/2005 | Oomen et al. ................. 381/23 |
| 2006/0206323 | A1 | | 9/2006 | Breebaart ................... 704/230 |

FOREIGN PATENT DOCUMENTS

| | | |
|---|---|---|
| EP | 1 107 232 A2 | 6/2001 |
| EP | 1 376 538 A1 | 1/2004 |
| EP | 1 479 071 B1 | 1/2006 |
| JP | 07123008 | 5/1995 |
| RU | 2214048 C2 | 10/2003 |
| TW | 347623 | 12/1998 |
| TW | 360859 | 6/1999 |
| TW | 444511 | 7/2001 |
| TW | 510144 | 11/2002 |
| TW | 517223 | 1/2003 |
| TW | 521261 | 2/2003 |
| WO | WO 03/090207 A1 | 10/2003 |
| WO | WO 03/094369 A2 | 11/2003 |
| WO | WO 2004/008806 A1 | 1/2004 |
| WO | WO 2004/049309 A1 | 6/2004 |
| WO | WO 2004/077884 A1 | 9/2004 |
| WO | WO 2004/086817 A2 | 10/2004 |
| WO | WO 2005/069274 A1 | 7/2005 |

OTHER PUBLICATIONS

"Binaural Cue Coding—Part I: Psychoacoustic Fundamentals and Design Principles", by Frank Baumgrate et al., IEEE Transactions on Speech and Audio Processing, vol. II, No. 6, Nov. 2003, pp. 509-519.

"Binaural Cue Coding—Part II: Schemes and Applications", by Christof Faller et al., IEEE Transactions on Speech and Audio Processing, vol. II, No. 6, Nov. 2003, pp. 520-531.

"Low Complexity Parametric Stereo Coding", by Erik Schuijers et al., Audio Engineering Society 116th Convention Paper 6073, May 8-11, 2004, Berlin, Germany, pp. 1-11.

"MP3 Surround: Efficient and Compatible Coding of Multi-Channel Audio", by Juergen Herre et al., Audio Engineering Society 116th Convention Paper, May 8-11, 2004, Berlin, Germany, pp. 1-14.

"Binaural Cue Coding: Rendering of Sources Mixed into a Mono Signal" by Christof Faller, Media Signal Processing Research, Agere Systems, Allentown, PA, USA, 2 pages.

"HILN- The MPEG-4 Parametric Audio Coding Tools" by Heiko Purnhagen and Nikolaus Meine, University of Hannover, Hannover, Germany, 4 pages.

"Parametric Audio Coding" by Bernd Edler and Heiko Purnhagen, University of Hannover, Hannover, Germany, pp. 1-4.

"Advances in Parametric Audio Coding" by Heiko Purnhagen, Proc. 1999 IEEE Workshop on Applications of Signal Processing to Audio and Acoustics, New Paltz, New York, Oct. 17-20, 1999, pp. W99-1-W99-4.

"Advances in Parametric Coding for High-Quality Audio," by E.G.P. Schuijers et al., Proc. 1st IEEE Benelux Workshop on Model Based Processing and Coding of Audio (MPCA-2002), Leuven, Belgium, Nov. 15, 2002, pp. 73-79, XP001156065.

"Improving Audio Codecs by Noise Substitution," by Donald Schulz, Journal of the Audio Engineering Society, vol. 44, No. 7/8, Jul./Aug. 1996, pp. 593-598, XP000733647.

"The Reference Model Architecture for MPEG Spatial Audio Coding," by Juergen Herre et al., Audio Engineering Society Convention Paper 6447, 118th Convention, May 28-31, 2005, Barcelona, Spain, pp. 1-13, XP009059973.

"From Joint Stereo to Spatial Audio Coding—Recent Progress and Standardization," by Jurgen Herre, Proc. of the 7th Int. Conference on Digital Audio Effects (DAFx' 04), Oct. 5-8, 2004, Naples, Italy, XP002367849.

"Parametric Coding of Spatial Audio," by Christof Faller, Proc. of the 7th Int. Conference on Digital Audio Effects (DAFx' 04), Oct. 5-8, 2004, Naples, Itlay, XP002367850.

"Binaural Cue Coding Applied to Stereo and Multi-Channel Audio Compression," by Christof Faller et al., Audio Engineering Society 112th Covention, Munich, Germany, vol. 112, No. 5574, May 10, 2002, pp. 1-9.

"Binaural Cue Coding Applied to Stereo and Multi-Channel Audio Compression", by Christof Faller et al., Audio Engineering Society Convention Paper, 112th Convention, Munich, Germany, May 10-13, 2002, pp. 1-9.

"Advances in Parametric Coding for High-Quality Audio", by Erik Schuijers et al., Audio Engineerying Society Convention Paper 5852, 114th Convention, Amsterdam, The Netherlands, Mar. 22-25, 2003, pp. 1-11.

"Colorless Artificial Reverberation", by M.R. Schroeder et al., IRE Transactions on Audio, pp. 209-214, (Originally Published by: J. Audio Engrg. Soc., vol. 9, pp. 192-197, Jul. 1961).

"Efficient Representation of Spatial Audio Using Perceptual Parametrization" by Christof Faller etl al., IEEE Workshop on Applications of Signal Processing to Audio and Acoustics 2001, Oct. 21-24, 2001, New Paltz, New York, pp. W2001-01 to W2001-4.

"3D Audio and Acoustic Environment Modeling" by William G. Gardner, HeadWize Technical Paper, Jan. 2001, pp. 1-11.

"Responding to One of Two Simultaneous Message", by Walter Spieth et al., The Journal of the Acoustical Society of America, vol. 26, No. 3, May 1954, pp. 391-396.

"A Speech Corpus for Multitalker Communications Research", by Robert S. Bolia, et al., J. Acoust. Soc., Am., vol. 107, No. 2, Feb. 2000, pp. 1065-1066.

"Synthesized Stereo Combined with Acoustic Echo Cancellation for Desktop Conferencing", by Jacob Benesty et al., Bell Labs Technical Journal, Jul.-Sep. 1998, pp. 148-158.

"The Role of Perceived Spatial Separation in the Unmasking of Speech", by Richard Freyman et al., J. Acoust. Soc., Am., vol. 106, No. 6, Dec. 1999, pp. 3578-3588.

"Text of ISO/IEC 14496-3:2002/PDAM 2 (Parametric coding for High Quality Audio)", by International Organisation for Standisation ISO/IEC JTC1/SC29/WG11 Coding of Moving Pictures and Audio, MPEG2002 N5381 Awaji Island, Dec. 2002, pp. 1-69.

"MPEG Audio Layer II: A Generic Coding Standard For Two And Multichannel Sound For DVB, DAB and Computer Multimedia," by G. Stoll, International Broadcasting Convention, Sep. 14-18, 1995, Germany, XP006528918, pp. 136-144.

"Surround Sound Past, Present, and Future" by Joseph Hull; Dolby Laboratories Inc.; 1999; 8 pages.

"Multichannel Natural Music Recording Based on Psychoacoustic Principles", by Gunther Theile, Extended version of the paper presented at the AES 19$^{th}$ International Conference, May 2001, Oct. 2001, pp. 1-45.

* cited by examiner

CUE-BASED AUDIO CODING/DECODING

CROSS-REFERENCE TO RELATED APPLICATIONS

This application claims the benefit of the filing date of U.S. provisional application No. 60/585,703, filed on Jul. 6, 2004, the teachings of which are incorporated herein by reference.

In addition, this application is a continuation-in-part of the following co-pending applications, the teachings of all of which are incorporated herein by reference:

U.S. application Ser. No. 09/848,877, filed on May 4, 2001 now U.S. Pat. No. 7,116,787;

U.S. application Ser. No. 10/045,458, filed on Nov. 7, 2001 now abandoned, which itself claimed the benefit of the filing date of U.S. provisional application No. 60/311,565, filed on Aug. 10, 2001;

U.S. application Ser. No. 10/155,437, filed on May 24, 2002 now U.S. Pat. No. 7,006,636;

U.S. application Ser. No. 10/246,570, filed on Sep. 18, 2002 now U.S. Pat. No. 7,292,901, which itself claimed the benefit of the filing date of U.S. provisional application No. 60/391,095, filed on Jun. 24, 2002; and U.S. application Ser. No. 10/815,591, filed on Apr. 1, 2004, which itself claimed the benefit of the filing date of U.S. provisional application No. 60/544,287, filed on Feb. 12, 2004.

BACKGROUND OF THE INVENTION

1. Field of the Invention

The present invention relates to the encoding of audio signals and the subsequent synthesis of auditory scenes from the encoded audio data.

2. Description of the Related Art

When a person hears an audio signal (i.e., sounds) generated by a particular audio source, the audio signal will typically arrive at the person's left and right ears at two different times and with two different audio (e.g., decibel) levels, where those different times and levels are functions of the differences in the paths through which the audio signal travels to reach the left and right ears, respectively. The person's brain interprets these differences in time and level to give the person the perception that the received audio signal is being generated by an audio source located at a particular position (e.g., direction and distance) relative to the person. An auditory scene is the net effect of a person simultaneously hearing audio signals generated by one or more different audio sources located at one or more different positions relative to the person.

The existence of this processing by the brain can be used to synthesize auditory scenes, where audio signals from one or more different audio sources are purposefully modified to generate left and right audio signals that give the perception that the different audio sources are located at different positions relative to the listener.

FIG. 1 shows a high-level block diagram of conventional binaural signal synthesizer 100, which converts a single audio source signal (e.g., a mono signal) into the left and right audio signals of a binaural signal, where a binaural signal is defined to be the two signals received at the eardrums of a listener. In addition to the audio source signal, synthesizer 100 receives a set of spatial cues corresponding to the desired position of the audio source relative to the listener. In typical implementations, the set of spatial cues comprises an inter-channel level difference (ICLD) value (which identifies the difference in audio level between the left and right audio signals as received at the left and right ears, respectively) and an inter-channel time difference (ICTD) value (which identifies the difference in time of arrival between the left and right audio signals as received at the left and right ears, respectively). In addition or as an alternative, some synthesis techniques involve the modeling of a direction-dependent transfer function for sound from the signal source to the eardrums, also referred to as the head-related transfer function (HRTF). See, e.g., J. Blauert, *The Psychophysics of Human Sound Localization*, MIT Press, 1983, the teachings of which are incorporated herein by reference.

Using binaural signal synthesizer 100 of FIG. 1, the mono audio signal generated by a single sound source can be processed such that, when listened to over headphones, the sound source is spatially placed by applying an appropriate set of spatial cues (e.g., ICLD, ICTD, and/or HRTF) to generate the audio signal for each ear. See, e.g., D. R. Begault, 3-*D Sound for Virtual Reality and Multimedia*, Academic Press, Cambridge, Mass., 1994.

Binaural signal synthesizer 100 of FIG. 1 generates the simplest type of auditory scenes: those having a single audio source positioned relative to the listener. More complex auditory scenes comprising two or more audio sources located at different positions relative to the listener can be generated using an auditory scene synthesizer that is essentially implemented using multiple instances of binaural signal synthesizer, where each binaural signal synthesizer instance generates the binaural signal corresponding to a different audio source. Since each different audio source has a different location relative to the listener, a different set of spatial cues is used to generate the binaural audio signal for each different audio source.

SUMMARY OF THE INVENTION

In binaural cue coding (BCC), an encoder encodes C input audio channels to generate E transmitted audio channels, where C>E≧1. In particular, two or more of the C input channels are provided in a frequency domain, and one or more cue codes are generated for each of one or more different frequency bands in the two or more input channels in the frequency domain. In addition, the C input channels are downmixed to generate the E transmitted channels. In some downmixing implementations, at least one of the E transmitted channels is based on two or more of the C input channels, and at least one of the E transmitted channels is based on only a single one of the C input channels.

In one embodiment, a BCC coder has two or more filter banks, a code estimator, and a downmixer. The two or more filter banks convert two or more of the C input channels from a time domain into a frequency domain. The code estimator generates one or more cue codes for each of one or more different frequency bands in the two or more converted input channels. The downmixer downmixes the C input channels to generate the E transmitted channels, where C>E≧1.

In BCC decoding, E transmitted audio channels are decoded to generate C playback audio channels. In particular, for each of one or more different frequency bands, one or more of the E transmitted channels are upmixed in a frequency domain to generate two or more of the C playback channels in the frequency domain, where C>E≧1. One or more cue codes are applied to each of the one or more different frequency bands in the two or more playback channels in the frequency domain to generate two or more modified channels, and the two or more modified channels are converted from the frequency domain into a time domain. In some upmixing implementations, at least one of the C playback channels is based on at least one of the E transmitted channels and at least one cue code, and at least one of the C playback channels is based on only a single one of the E transmitted channels and independent of any cue codes.

In one embodiment, a BCC decoder has an upmixer, a synthesizer, and one or more inverse filter banks. For each of one or more different frequency bands, the upmixer upmixes one or more of the E transmitted channels in a frequency domain to generate two or more of the C playback channels in the frequency domain, where $C>E \geq 1$. The synthesizer applies one or more cue codes to each of the one or more different frequency bands in the two or more playback channels in the frequency domain to generate two or more modified channels. The one or more inverse filter banks convert the two or more modified channels from the frequency domain into a time domain.

BCC encoders and/or decoders may be incorporated into a number of systems or applications including, for example, digital video recorders/players, digital audio recorders/players, computers, satellite transmitters/receivers, cable transmitters/receivers, terrestrial broadcast transmitters/receivers, home entertainment systems, and movie theater systems.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Generic BCC Processing

Figure 1:
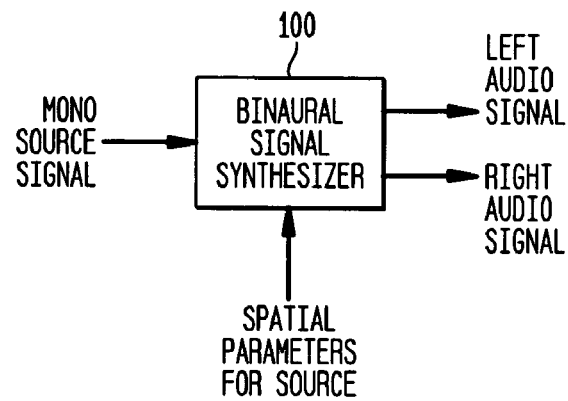
FIG. 1 shows a high-level block diagram of conventional binaural signal synthesizer.
Figure 2:
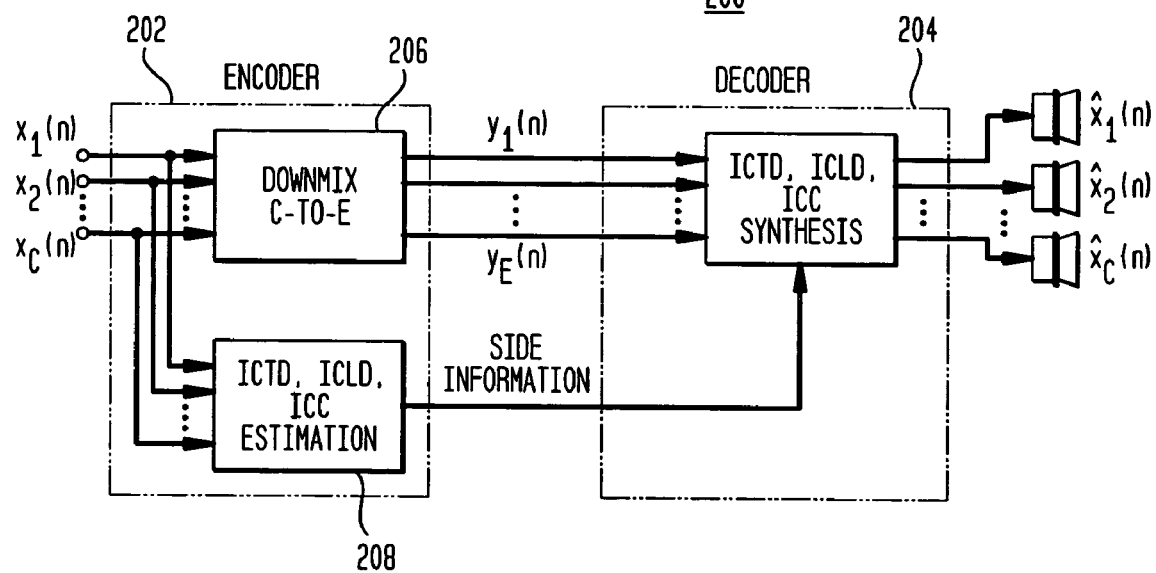
FIG. 2 is a block diagram of a generic binaural cue coding (BCC) audio processing system.

FIG. 2 is a block diagram of a generic binaural cue coding (BCC) audio processing system 200 comprising an encoder 202 and a decoder 204. Encoder 202 includes downmixer 206 and BCC estimator 208.

Downmixer 206 converts C input audio channels $x_i(n)$ into E transmitted audio channels $y_i(n)$, where $C>E \geq 1$. In this specification, signals expressed using the variable n are time-domain signals, while signals expressed using the variable k are frequency-domain signals. Depending on the particular implementation, downmixing can be implemented in either the time domain or the frequency domain. BCC estimator 208 generates BCC codes from the C input audio channels and transmits those BCC codes as either in-band or out-of-band side information relative to the E transmitted audio channels.

Typical BCC codes include one or more of inter-channel time difference (ICTD), inter-channel level difference (ICLD), and inter-channel correlation (ICC) data estimated between certain pairs of input channels as a function of frequency and time. The particular implementation will dictate between which particular pairs of input channels, BCC codes are estimated.

ICC data corresponds to the coherence of a binaural signal, which is related to the perceived width of the audio source. The wider the audio source, the lower the coherence between the left and right channels of the resulting binaural signal. For example, the coherence of the binaural signal corresponding to an orchestra spread out over an auditorium stage is typically lower than the coherence of the binaural signal corresponding to a single violin playing solo. In general, an audio signal with lower coherence is usually perceived as more spread out in auditory space. As such, ICC data is typically related to the apparent source width and degree of listener envelopment. See, e.g., J. Blauert, *The Psychophysics of Human Sound Localization*, MIT Press, 1983.

Depending on the particular application, the E transmitted audio channels and corresponding BCC codes may be transmitted directly to decoder 204 or stored in some suitable type of storage device for subsequent access by decoder 204. In either case, decoder 204 receives the transmitted audio channels and side information and performs upmixing and BCC synthesis using the BCC codes to convert the E transmitted audio channels into more than E (typically, but not necessarily, C) playback audio channels $\hat{x}_i(n)$ for audio playback. Depending on the particular implementation, upmixing can be performed in either the time domain or the frequency domain.

In addition to the BCC processing shown in FIG. 2, a generic BCC audio processing system may include additional encoding and decoding stages to further compress the audio signals at the encoder and then decompress the audio signals at the decoder, respectively. These audio codecs may be based on conventional audio compression/decompression techniques such as those based on pulse code modulation (PCM), differential PCM (DPCM), or adaptive DPCM (ADPCM).

Generic Downmixing

Figure 3:
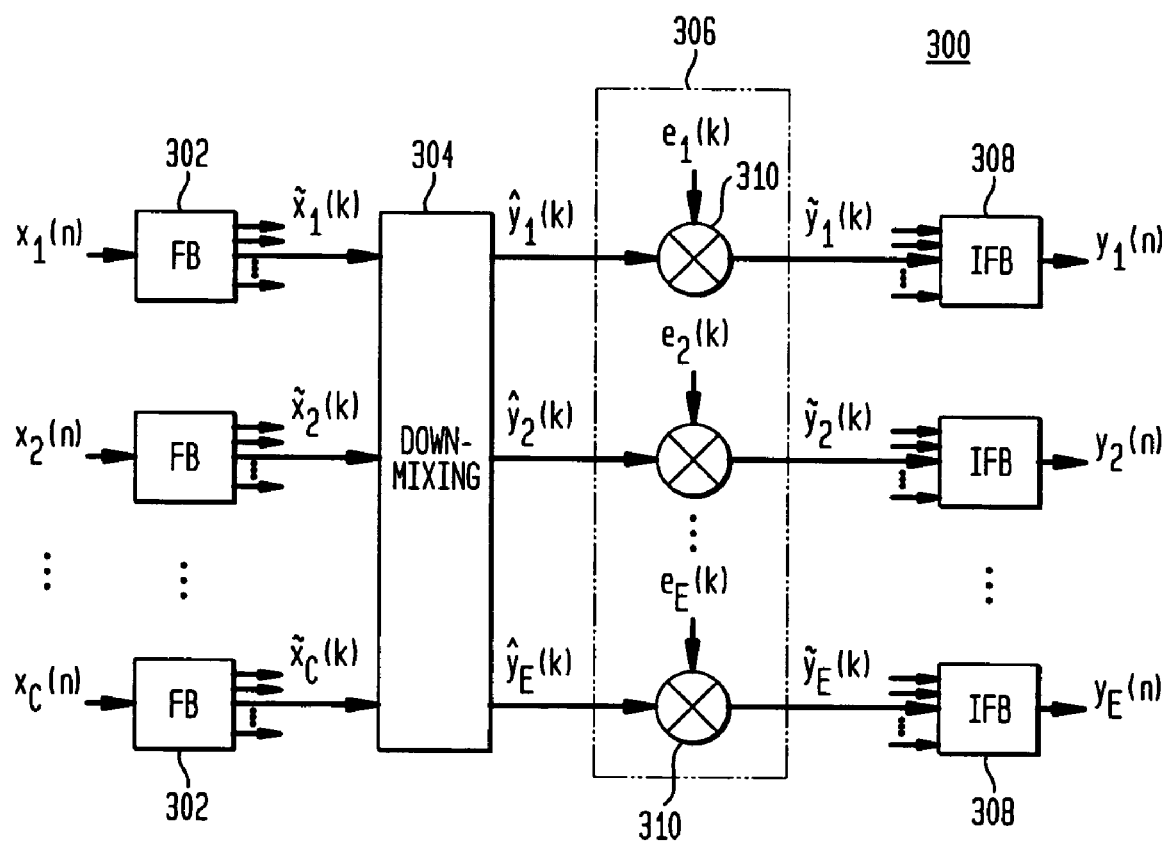
FIG. 3 shows a block diagram of a downmixer that can used for the downmixer of FIG. 2.

FIG. 3 shows a block diagram of a downmixer 300 that can used for downmixer 206 of FIG. 2 according to certain implementations of BCC system 200. Downmixer 300 has a filter bank (FB) 302 for each input channel $x_i(n)$, a downmixing block 304, an optional scaling/delay block 306, and an inverse FB (IFB) 308 for each encoded channel $y_i(n)$.

Each filter bank 302 converts each frame (e.g., 20 msec) of a corresponding digital input channel $x_i(n)$ in the time domain into a set of input coefficients $\tilde{x}_i(k)$ in the frequency domain. Downmixing block 304 downmixes each sub-band of C corresponding input coefficients into a corresponding sub-band of E downmixed frequency-domain coefficients. Equation (1) represents the downmixing of the kth sub-band of input coefficients $(\tilde{x}_1(k), \tilde{x}_2(k), \ldots, \tilde{x}_C(k))$ to generate the kth sub-band of downmixed coefficients $(\hat{y}_1(k), \hat{y}_2(k), \ldots, \hat{y}_E(k))$ as follows:

$$\begin{bmatrix} \hat{y}_1(k) \\ \hat{y}_2(k) \\ \vdots \\ \hat{y}_E(k) \end{bmatrix} = D_{CE} \begin{bmatrix} \tilde{x}_1(k) \\ \tilde{x}_2(k) \\ \vdots \\ \tilde{x}_C(k) \end{bmatrix}, \quad (1)$$

where $D_{CE}$ is a real-valued C-by-E downmixing matrix.

Optional scaling/delay block 306 comprises a set of multipliers 310, each of which multiplies a corresponding downmixed coefficient $\hat{y}_i(k)$ by a scaling factor $e_i(k)$ to generate a corresponding scaled coefficient $\tilde{y}_i(k)$. The motivation for the scaling operation is equivalent to equalization generalized for downmixing with arbitrary weighting factors for each channel. If the input channels are independent, then the power $p_{yi}(k)$ of the downmixed signal in each sub-band is given by Equation (2) as follows:

$$\begin{bmatrix} p_{\tilde{y}_1(k)} \\ p_{\tilde{y}_2(k)} \\ \vdots \\ p_{\tilde{y}_E(k)} \end{bmatrix} = \overline{D}_{CE} \begin{bmatrix} p_{\tilde{x}_1(k)} \\ p_{\tilde{x}_2(k)} \\ \vdots \\ p_{\tilde{x}_C(k)} \end{bmatrix}, \quad (2)$$

where $\overline{D}_{CE}$ is derived by squaring each matrix element in the C-by-E downmixing matrix $D_{CE}$.

If the sub-bands are not independent, then the power values $p_{yi}(k)$ of the downmixed signal will be larger or smaller than that computed using Equation (2), due to signal amplifications or cancellations when signal components are in-phase or out-of-phase, respectively. To prevent this, the downmixing operation of Equation (1) is applied in sub-bands followed by the scaling operation of multipliers 310. The scaling factors $e_i(k$ ($1 \leq i \leq E$) can be derived using Equation (3) as follows:

$$e_i(k) = \sqrt{\frac{p_{\tilde{y}_i(k)}}{p_{\hat{y}_i(k)}}}, \quad (3)$$

where $p_{yi}(k)$ is the sub-band power as computed by Equation (2), and $p_{\hat{y}i(k)}$ is power of the corresponding downmixed sub-band signal $\hat{y}_i(k)$.

In addition to or instead of providing optional scaling, scaling/delay block 306 may optionally apply delays to the signals.

Each inverse filter bank 308 converts a set of corresponding scaled coefficients $\tilde{y}_i(k)$ in the frequency domain into a frame of a corresponding digital, transmitted channel $y_i(n)$.

Although FIG. 3 shows all C of the input channels being converted into the frequency domain for subsequent downmixing, in alternative implementations, one or more (but less than C-1) of the C input channels might bypass some or all of the processing shown in FIG. 3 and be transmitted as an equivalent number of unmodified audio channels. Depending on the particular implementation, these unmodified audio channels might or might not be used by BCC estimator 208 of FIG. 2 in generating the transmitted BCC codes.

Generic BCC Synthesis

Figure 4:
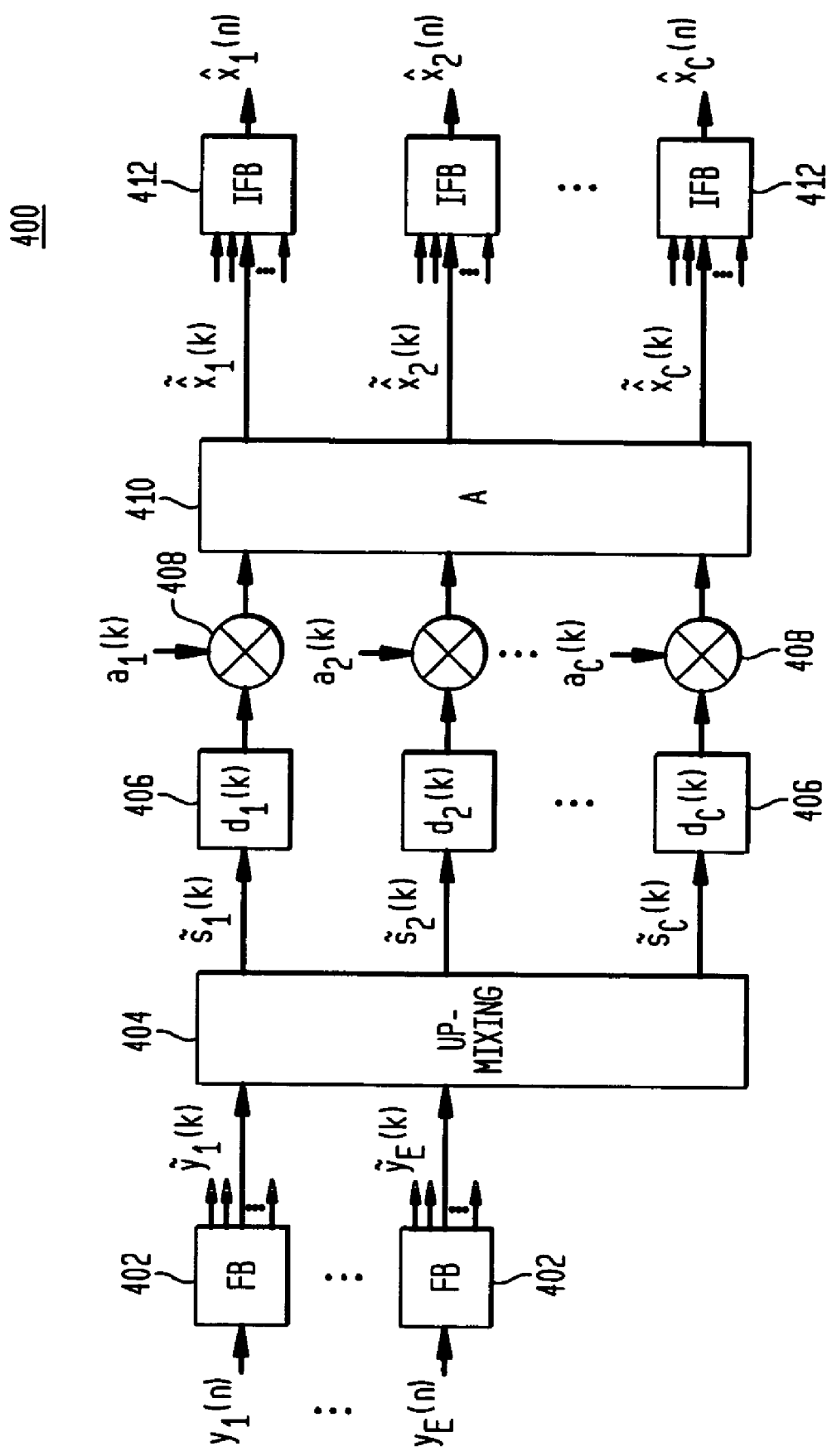
FIG. 4 shows a block diagram of a BCC synthesizer that can used for the decoder of FIG. 2

FIG. 4 shows a block diagram of a BCC synthesizer 400 that can used for decoder 204 of FIG. 2 according to certain implementations of BCC system 200. BCC synthesizer 400 has a filter bank 402 for each transmitted channel $y_i(n)$, an upmixing block 404, delays 406, multipliers 408, correlation block 410, and an inverse filter bank 412 for each playback channel $\hat{x}_i(n)$.

Each filter bank 402 converts each frame of a corresponding digital, transmitted channel $y_i(n)$ in the time domain into a set of input coefficients $\tilde{y}_i(k)$ in the frequency domain. Upmixing block 404 upmixes each sub-band of E corresponding transmitted-channel coefficients into a corresponding sub-band of C upmixed frequency-domain coefficients. Equation (4) represents the upmixing of the kth sub-band of transmitted-channel coefficients $(\tilde{y}_1(k), \tilde{y}_2(k), \ldots, \tilde{y}_E(k))$ to generate the kth sub-band of upmixed coefficients $(\tilde{s}_1(k), \tilde{s}_2(k), \ldots, \tilde{s}_C(k))$ as follows:

$$\begin{bmatrix} \tilde{s}_1(k) \\ \tilde{s}_2(k) \\ \vdots \\ \tilde{s}_C(k) \end{bmatrix} = U_{EC} \begin{bmatrix} \tilde{y}_1(k) \\ \tilde{y}_2(k) \\ \vdots \\ \tilde{y}_E(k) \end{bmatrix}, \quad (4)$$

where $U_{EC}$ is a real-valued E-by-C upmixing matrix. Performing upmixing in the frequency-domain enables upmixing to be applied individually in each different sub-band.

Each delay 406 applies a delay value $d_i(k)$ based on a corresponding BCC code for ICTD data to ensure that the desired ICTD values appear between certain pairs of playback channels. Each multiplier 408 applies a scaling factor $a_i(k)$ based on a corresponding BCC code for ICLD data to ensure that the desired ICLD values appear between certain pairs of playback channels. Correlation block 410 performs a matrix operation A based on corresponding BCC codes for ICC data to ensure that the desired ICC values appear between certain pairs of playback channels. Further description of the operations of correlation block 410 can be found in U.S. patent application Ser. No. 10/155,437, filed on May 24, 2002 as Baumgarte 2-10.

The synthesis of ICLD values may be less troublesome than the synthesis of ICTD and ICC values, since ICLD synthesis involves merely scaling of sub-band signals. Since ICLD cues are the most commonly used directional cues, it is usually more important that the ICLD values approximate those of the original audio signal. As such, ICLD data might be estimated between all channel pairs. The scaling factors $a_i(k)$ ($1 \leq i \leq C$) for each sub-band are preferably chosen such that the sub-band power of each playback channel approximates the corresponding power of the original input audio channel.

One goal may be to apply relatively few signal modifications for synthesizing ICTD and ICC values. As such, the BCC data might not include ICTD and ICC values for all channel pairs. In that case, BCC synthesizer 400 would synthesize ICTD and ICC values only between certain channel pairs.

Each inverse filter bank 412 converts a set of corresponding synthesized coefficients $\hat{x}_i(k)$ in the frequency domain into a frame of a corresponding digital, playback channel $\hat{x}_i(n)$.

Although FIG. 4 shows all E of the transmitted channels being converted into the frequency domain for subsequent upmixing and BCC processing, in alternative implementations, one or more (but not all) of the E transmitted channels might bypass some or all of the processing shown in FIG. 4. For example, one or more of the transmitted channels may be unmodified channels that are not subjected to any upmixing.

In addition to being one or more of the C playback channels, these unmodified channels, in turn, might be, but do not have to be, used as reference channels to which BCC processing is applied to synthesize one or more of the other playback channels. In either case, such unmodified channels may be subjected to delays to compensate for the processing time involved in the upmixing and/or BCC processing used to generate the rest of the playback channels.

Note that, although FIG. 4 shows C playback channels being synthesized from E transmitted channels, where C was also the number of original input channels, BCC synthesis is not limited to that number of playback channels. In general, the number of playback channels can be any number of channels, including numbers greater than or less than C and possibly even situations where the number of playback channels is equal to or less than the number of transmitted channels. For example, six transmitted, non-LFE channels be used to synthesize the six channels of 5.1 surround sound, or vice versa.

5-to-2 BCC Processing

Figure 5A:
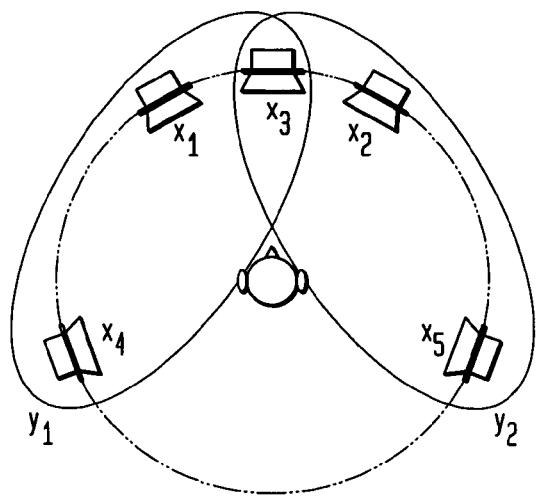
FIG. 5 represents one possible implementation of 5-to-2 BCC processing.

FIG. 5 represents one possible implementation of 5-to-2 BCC processing in which five input channels $x_i(n)$ are downmixed to two transmitted channels $y_i(n)$, which are subsequently subjected to upmixing and BCC synthesis to form five playback channels $\hat{x}_i(n)$, for the loudspeaker arrangement shown in FIG. 5A.

In particular, FIG. 5A represents the downmixing scheme applied to the five input channels $x_i(n)$ to generate the two transmitted channels $y_i(n)$, where the downmixing matrix $D_{52}$ used in Equation (1) is given by Equation (5) as follows:

$$D_{52} = \begin{bmatrix} 1 & 0 & \frac{1}{\sqrt{2}} & 1 & 0 \\ 0 & 1 & \frac{1}{\sqrt{2}} & 0 & 1 \end{bmatrix}, \quad (5)$$

where the scale factors are chosen such that the sum of the squares of the value in each column is one, so that the power of each input signal contributes equally to the downmixed signals. As shown in FIG. 5A, transmitted channel 1 (i.e., the left channel in a stereo signal) is generated from input channels 1, 3, and 4 (i.e., the left, center, and left rear channels, respectively), and transmitted channel 2 (i.e., the right channel) is generated from input channels 2, 3, and 5 (i.e., the right, center, and right rear channels, respectively), where, according to Equation (5), the power of the center channel 3 is split evenly between the left and right transmitted channels.

Figure 5B:
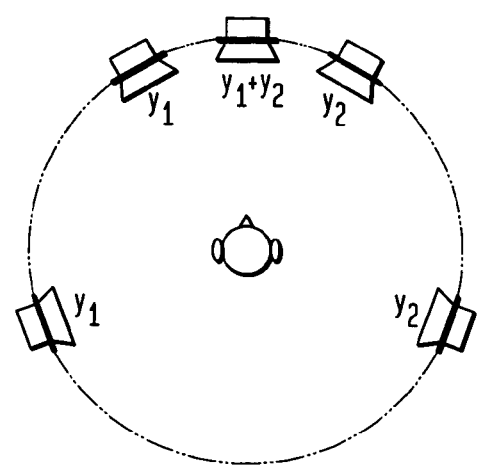

FIG. 5B represents the upmixing scheme applied to the two transmitted channels $y_i(n)$ to generate five upmixed channels $\tilde{s}_i$, where the upmixing matrix $U_{25}$ used in Equation (4) is given by Equation (6) as follows:

$$U_{25} = \begin{bmatrix} 1 & 0 \\ 0 & 1 \\ 1 & 1 \\ 1 & 0 \\ 0 & 1 \end{bmatrix}. \quad (6)$$

Note that, when the upmixed signals are subsequently normalized and re-scaled during ICLD synthesis, the scaling of the rows in the upmixing matrix is not relevant. As shown in FIG. 5B, the transmitted left channel 1 is used as the base channel for the playback left and left rear channels 1 and 4, the transmitted right channel 2 is used as the base channel for the playback right and right rear channels 2 and 5, and the sum of both transmitted channels is used as the base channel for the playback center channel 3.

Figure 5C:
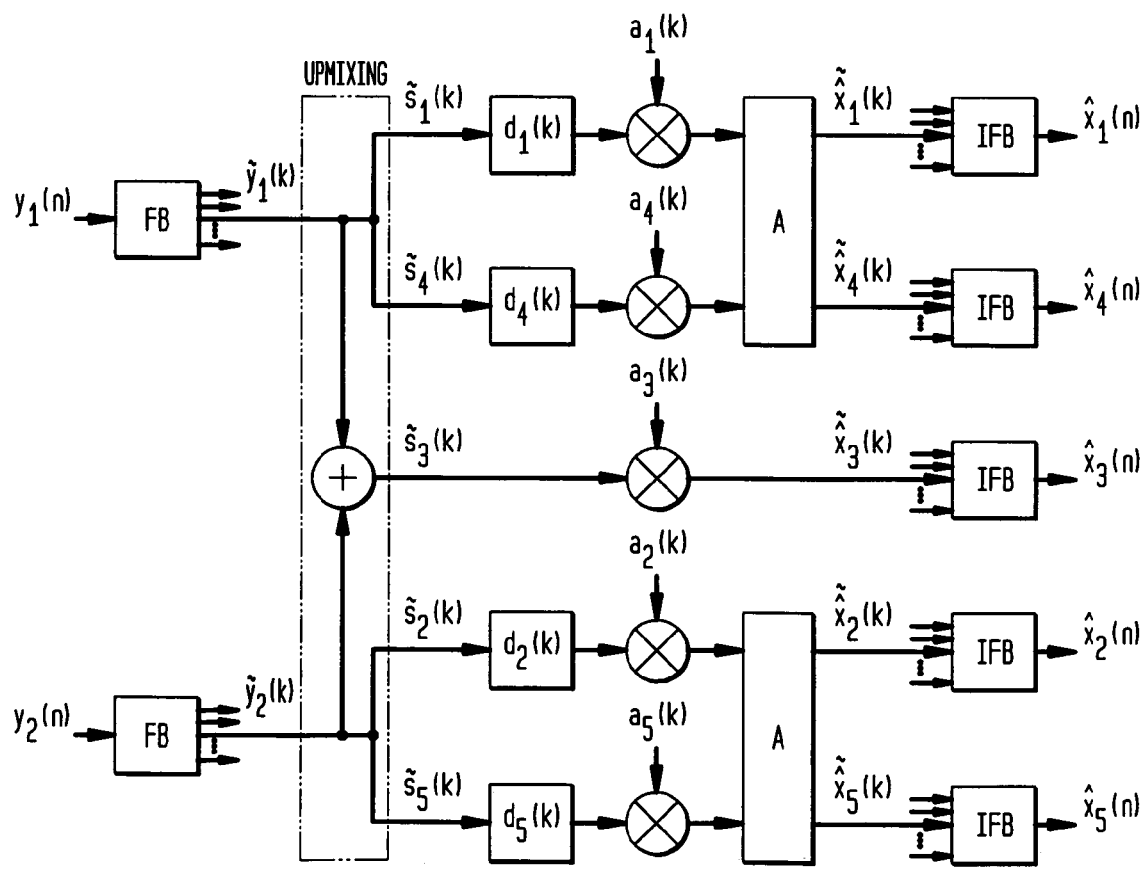

FIG. 5C shows the upmixing and BCC synthesis applied to the two transmitted channels at the decoder. Note that ICTD and ICC synthesis is applied between the channel pairs for which the same base channel is used, i.e., between the left and rear left channels and between the right and right rear channels. In one particular implementation of the 5-to-2 BCC processing of FIG. 5, the BCC codes transmitted as side information are limited to the ICLD values $\Delta L_{12}$, $\Delta L_{13}$, $\Delta L_{14}$, and $\Delta L_{15}$, the ICTD values $\tau_{14}$ and $\tau_{25}$, and the ICC values $c_{14}$ and $c_{25}$, where the sub-scripts identify the pair of channels between which the BCC code value is estimated. Other implementations can employ different sets of BCC code data, including using a channel other than the left channel $y_1$ as the reference for all ICLD estimates. In general, the transmitted BCC code data can be limited to only those values needed to synthesize the playback audio channels. Note that, in the implementation of FIG. 5C, ICTD and ICC synthesis is not applied to the center channel.

One advantage of the 5-to-2 BCC processing of FIG. 5 is that the two transmitted channels 1 and 2 can be played back as left and right channels on a "legacy" stereo receiver that is unaware of BCC processing and ignores the BCC side information. The techniques applied in 5-to-2 BCC processing can be generalized to any C-to-2 BCC scheme, where the two transmitted channels are capable of being played back on a legacy stereo receiver. These techniques can be generalized further still to any C-to-E BCC scheme, where the E transmitted channels are capable of being played back on a legacy E-channel receiver.

The 5-to-2 BCC scheme of FIG. 5 can also be extended to a 5.1-to-2 BCC scheme, where the six channels of 5.1 surround sound are downmixed to two transmitted channels, where the "0.1" indicates the low-frequency effects (LFE) channel in 5.1 surround sound. In this scheme, like the center channel in FIG. 5, the LFE channel can be attenuated by 3 dB and added to both transmitted channels. In that case, the base channel for synthesizing the playback LFE channel at the decoder is the sum of the two transmitted channels, as is the case for the playback center channel. As described in U.S. patent application Ser. No. 10/827,900, filed on Apr. 20, 2004, the teachings of which are incorporated herein by reference, BCC processing for the LFE channel might only be applied at certain (e.g., low) frequencies.

C-to-E BCC Processing with One or More Unmodified Channels

As mentioned earlier, in generating E transmitted channels from C input channels, one or more of the input channels may be transmitted as unmodified channels. In typical implementations, those unmodified channels are not used to generate any downmixed channels nor any BCC codes. Note that, in other possible implementations, in addition to being transmitted as unmodified channels, those input channels might still be used to generate one or more downmixed channels and/or some of the transmitted BCC codes. The following sections describe some possible BCC schemes in which one or more of the input channels are transmitted unmodified.

As used in this specification, the term "unmodified" means that the corresponding transmitted channel is based on only a single one of the input channels. That is, the transmitted channel is not the result of downmixing two or more different input channels. Note that, although the channel is referred to as being "unmodified," it might nevertheless be subject to non-BCC audio codec processing, e.g., to reduce the transmission bitrate.

6-to-5 BCC Processing

Figure 6A:
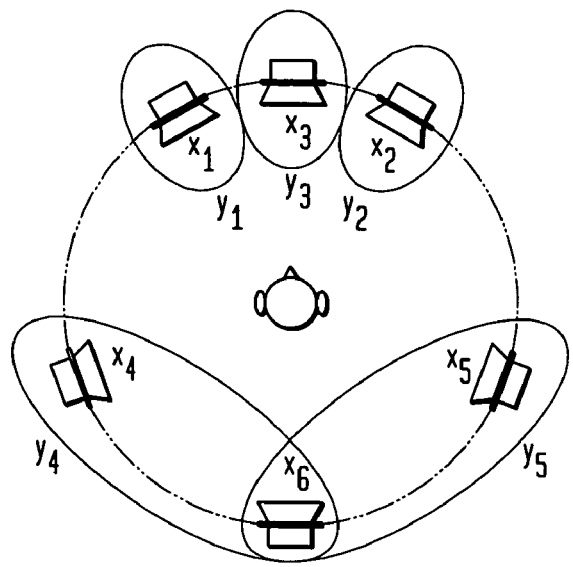
FIG. 6 represents one possible implementation of 6-to-5 BCC processing.

FIG. 6 represents one possible implementation of 6-to-5 BCC processing in which six input channels $x_i(n)$ are downmixed to five transmitted channels $y_i(n)$, which are subsequently subjected to upmixing and BCC synthesis to form six playback channels $\hat{x}_i(n)$, for the loudspeaker arrangement shown in FIG. 6A. This 6-to-5 BCC scheme can be used for 5-channel backwards compatible coding of 6-channel surround signals, such as those used in "Dolby Digital-Surround EX."

In particular, FIG. 6A represents the downmixing scheme applied to the six input channels $x_i(n)$ to generate the five transmitted channels $y_i(n)$, where the downmixing matrix $D_{65}$, used in Equation (1) is given by Equation (7) as follows:

$$D_{65} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & \frac{1}{\sqrt{2}} \\ 0 & 0 & 0 & 0 & 1 & \frac{1}{\sqrt{2}} \end{bmatrix}, \quad (7)$$

where the three front channels 1, 2, and 3 are transmitted unmodified and the three rear channels 4, 5, and 6 are downmixed to two transmitted channels 4 and 5, for a total of five transmitted channels. The six-loudspeaker setup shown in FIG. 6 is used in "Dolby Digital-Surround EX."

Figure 6B:
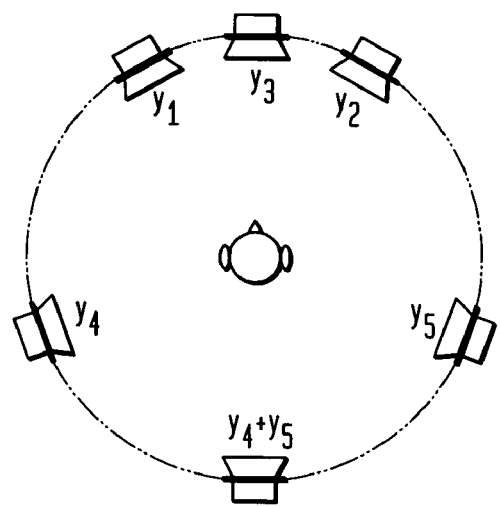

FIG. 6B represents the upmixing scheme applied to the five transmitted channels $y_i(n)$ to generate six upmixed channels $\tilde{s}_i$, where the upmixing matrix $U_{56}$ used in Equation (4) is given by Equation (8) as follows:

$$U_{56} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \\ 0 & 0 & 0 & 1 & 1 \end{bmatrix}. \quad (8)$$

In this case, the base channels for playback channels 1, 2, 3, 4, and 5 are the five transmitted channels 1, 2, 3, 4, and 5, respectively, while the sum of the left rear and right rear transmitted channels 4 and 5 is used as the base channel for the playback rear channel 6.

Figure 6C:
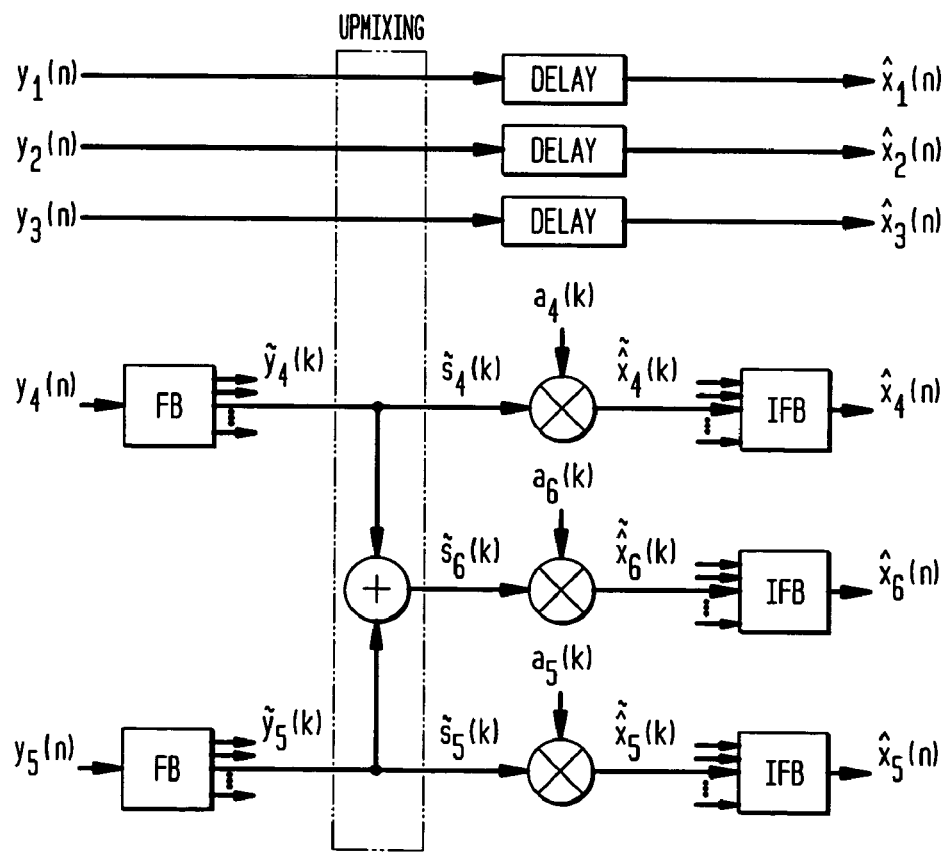

FIG. 6C shows the upmixing and BCC synthesis applied to the five transmitted channels at the decoder to generate the six playback channels. Since transmitted channels 1, 2, and 3 are unmodified, no forward and inverse filter banks are used for these channels, which are delayed to compensate for the BCC processing time of the other channels. Moreover, in this implementation, no ICTD or ICC synthesis is applied to generate playback channels 4, 5, and 6. As such, the BCC code data can be limited to $\Delta L_{46}$ and $\Delta L_{56}$.

Another possibility for downmixing the six input channels would be to add the left and rear left channels 1 and 4 to generate a first transmitted channel and add the right and rear right channels 2 and 5 to generate a second transmitted channel, where the other two channels 3 and 6 are left unmodified. In this 6-to-4 BCC scheme, the BCC synthesis at the decoder would apply ICTD and ICC synthesis between the playback left and rear left channels and between the playback right and rear right channels. Such a 6-to4 BCC scheme would give more emphasis to left/right independence, while the 6-to-5 BCC scheme of FIG. 6 gives more emphasis to front/back independence.

7-to-5 BCC Processing

Figure 7A:
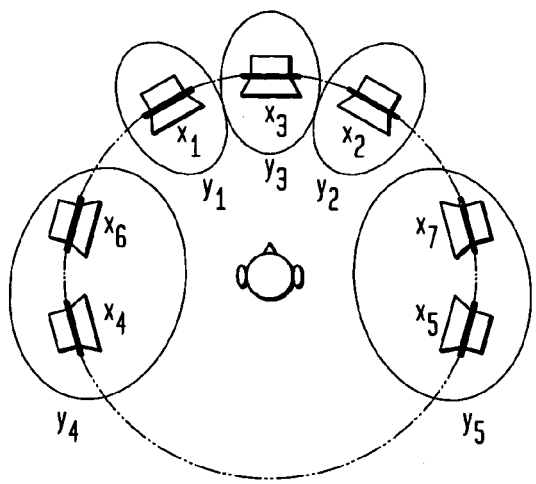
FIG. 7 represents one possible implementation of 7-to-5 BCC processing.

FIG. 7 represents one possible implementation of 7-to-5 BCC processing in which seven input channels $x_i(n)$ are downmixed to five transmitted channels $y_i(n)$, which are subsequently subjected to upmixing and BCC synthesis to form seven playback channels $\hat{x}_i(n)$, for the loudspeaker arrangement shown in FIG. 7A. This 7-to-5 BCC scheme can be used for 5-channel backwards compatible coding of 7-channel surround signals, such as those used in "Lexicon Logic 7."

In particular, FIG. 7A represents the downmixing scheme applied to the seven input channels $x_i(n)$ to generate the five transmitted channels $y_i(n)$, where the downmixing matrix $D_{75}$ used in Equation (1) is given by Equation (9) as follows:

$$D_{75} = \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 1 & 0 \\ 0 & 0 & 0 & 0 & 1 & 0 & 1 \end{bmatrix}, \quad (9)$$

where the three front channels 1, 2, and 3 are transmitted unmodified, and the four rear channels 4, 5, 6, and 7 are downmixed to two transmitted channels 4 and 5, for a total of five transmitted channels.

Figure 7B:
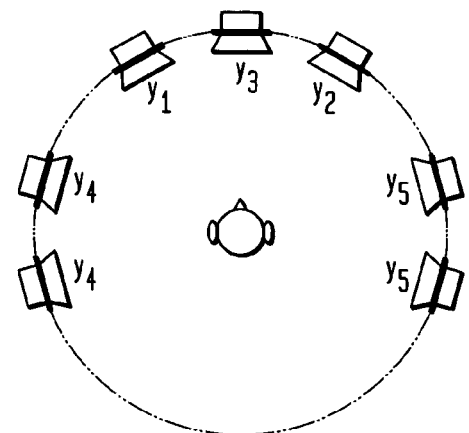

FIG. 7B represents the upmixing scheme applied to the five transmitted channels $y_i(n)$ to generate seven upmixed channels $\tilde{s}_i$, where the upmixing matrix $U_{57}$ used in Equation (4) is given by Equation (10) as follows:

$$U_{57} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \\ 0 & 0 & 0 & 1 & 0 \\ 0 & 0 & 0 & 0 & 1 \end{bmatrix}. \quad (10)$$

In this case, the base channels for playback channels 1, 2, and 3 are transmitted channels 1, 2, and 3, respectively, while transmitted channel 4 is used as the base channel for both playback channels 4 and 6 and transmitted channel 5 is used as the base channel for both playback channels 5 and 7.

Figure 7C:
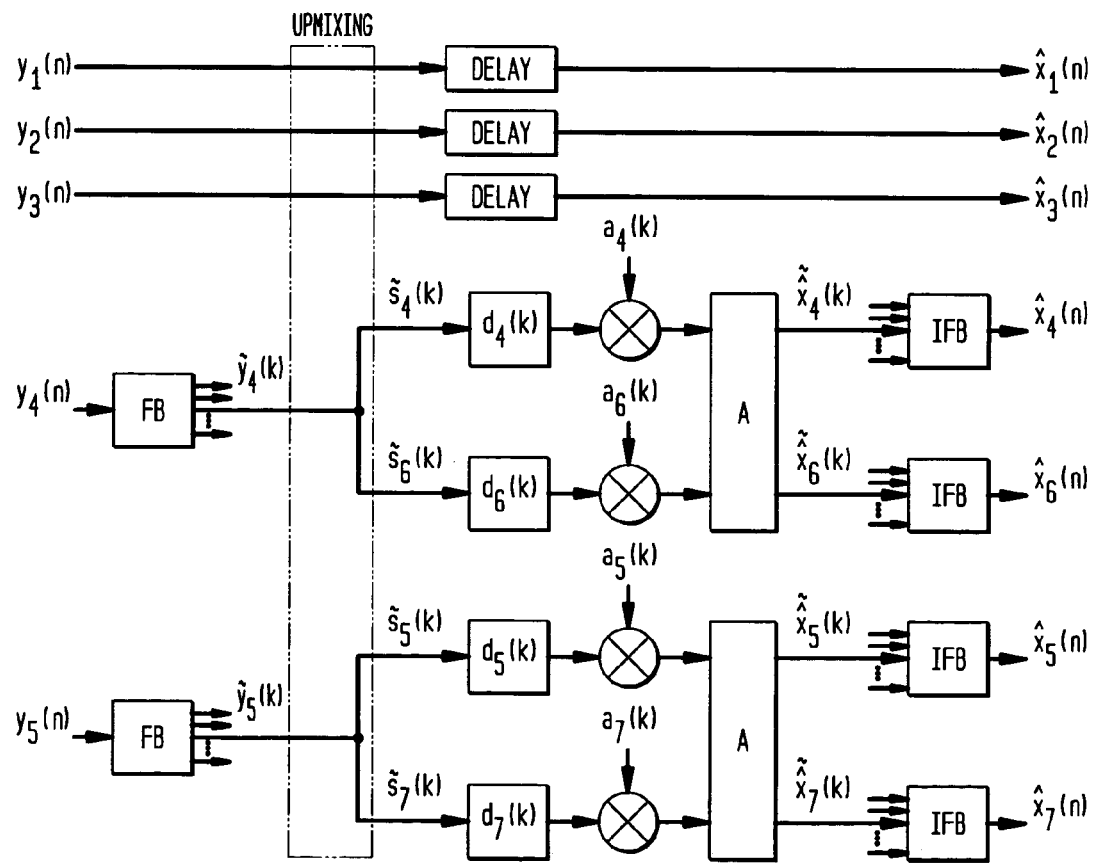

FIG. 7C shows the upmixing and BCC synthesis applied to the five transmitted channels at the decoder to generate the seven playback channels. Since transmitted channels 1, 2, and 3 are unmodified, no forward and inverse filter banks are used for these channels, which are delayed to compensate for the BCC processing time of the other channels. In this implementation, ICTD, ICLD, and ICC synthesis is applied between the two playback rear left channels and between the two playback rear right channels. As such, the BCC code data can be limited to $\Delta L_{46}$, $\Delta L_{57}$, $\tau_{46}$, $\tau_{57}$, $c_{46}$, and $c_{57}$.

6.1-to-5.1 BCC Processing

Figure 8A:
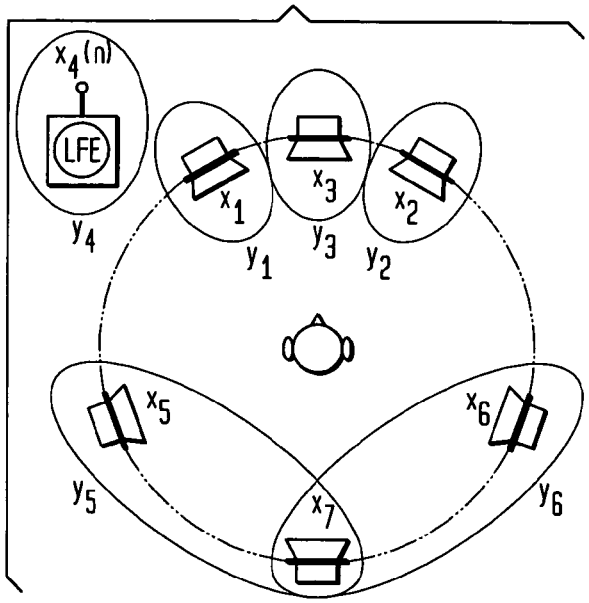
FIG. 8 represents one possible implementation of 6.1-to-5.1 BCC processing.

FIG. 8 represents one possible implementation of 6.1-to-5.1 BCC processing in which seven input channels $x_i(n)$ are downmixed to six transmitted channels $y_i(n)$, which are subsequently subjected to upmixing and BCC synthesis to form seven playback channels $\hat{x}_i(n)$, for the loudspeaker arrangement shown in FIG. 8A. This 6.1-to-5.1 BCC scheme can be used for 5.1-surround backwards compatible coding of 6.1-surround signals, such as those used in "Dolby Digital-Surround EX."

In particular, FIG. 8A represents the downmixing scheme applied to the seven input channels $x_i(n)$ to generate the six transmitted channels $y_i(n)$, where the downmixing matrix $D_{76}$ used in Equation (1) is given by Equation (11) as follows:

$$D_{76} = \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & \frac{1}{\sqrt{2}} \\ 0 & 0 & 0 & 0 & 0 & 1 & \frac{1}{\sqrt{2}} \end{bmatrix}, \quad (11)$$

where the three front channels 1, 2, and 3 and the LFE channel 4 are transmitted unmodified, and the three rear channels 5, 6, and 7 are downmixed to two transmitted channels 5 and 6, for a total of six transmitted channels.

Figure 8B:
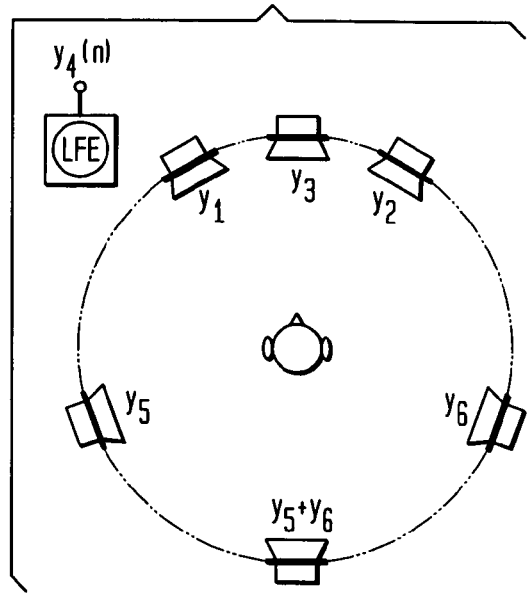

FIG. 8B represents the upmixing scheme applied to the six transmitted channels $y_i(n)$ to generate seven upmixed channels $\tilde{s}_i$, where the upmixing matrix $U_{67}$ used in Equation (4) is given by Equation (12) as follows:

$$U_{67} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 1 & 1 \end{bmatrix}. \quad (12)$$

In this case, the base channels for playback channels 1, 2, 3, 4, and 5 are transmitted channels 1, 2, 3, 4, and 5, respectively, while the sum of the left rear and right rear transmitted channels 5 and 6 is used as the base channel for the playback rear channel 7.

Figure 8C:
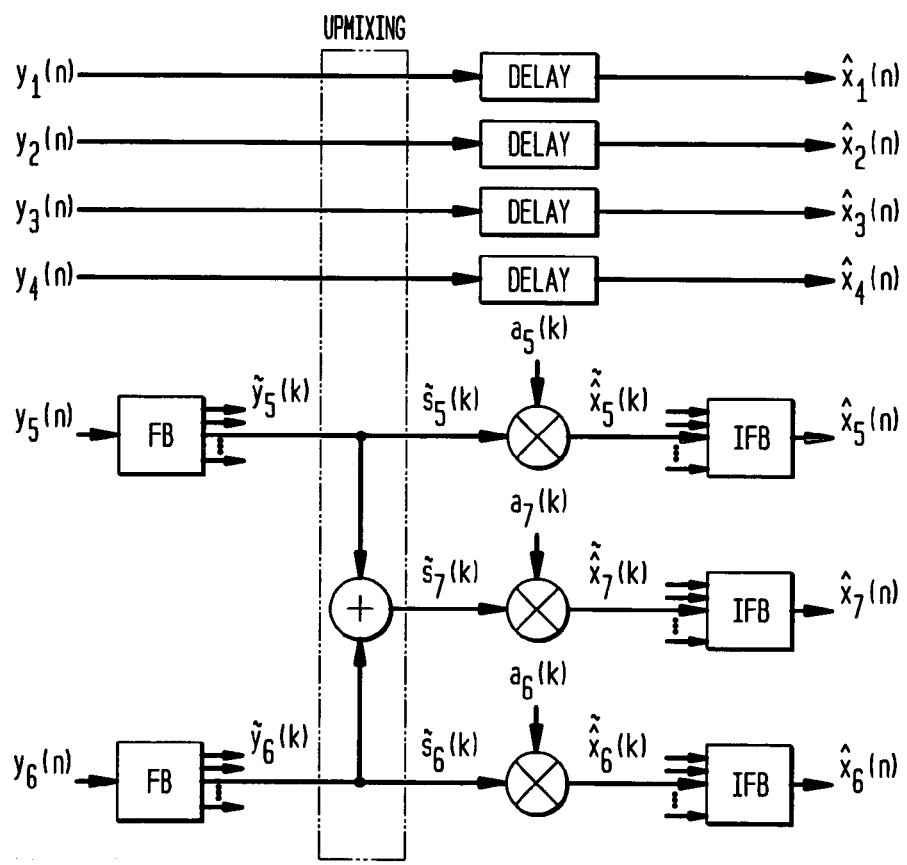

FIG. 8C shows the upmixing and BCC synthesis applied to the six transmitted channels at the decoder to generate the seven playback channels. Since transmitted channels 1, 2, 3, and 4 are unmodified, no forward and inverse filter banks are used for these channels, which are delayed to compensate for the BCC processing time of the other channels. In this implementation, no ICTD or ICC synthesis is applied to generate playback channels 5, 6, and 7. As such, the BCC code data can be limited to $\Delta L_{57}$ and $\Delta L_{67}$.

Another possibility for downmixing the seven input channels would be to add the left and rear left channels 1 and 5 to generate a first transmitted channel and add the right and rear right channels 2 and 6 to generate a second transmitted channel, where the other three channels 3, 4, and 7 are left unmodified. In this 6.1-to-4.1 BCC scheme, the BCC synthesis at the decoder would apply ICTD and ICC synthesis between the playback left and rear left channels and between the playback right and rear right channels. Such a 6.1-to-4.1 BCC scheme would give more emphasis to left/right independence, while the 6.1-to-5.1 BCC scheme of FIG. 8 gives more emphasis to front/back independence.

7.1-to-5.1 BCC Processing

Figure 9A:
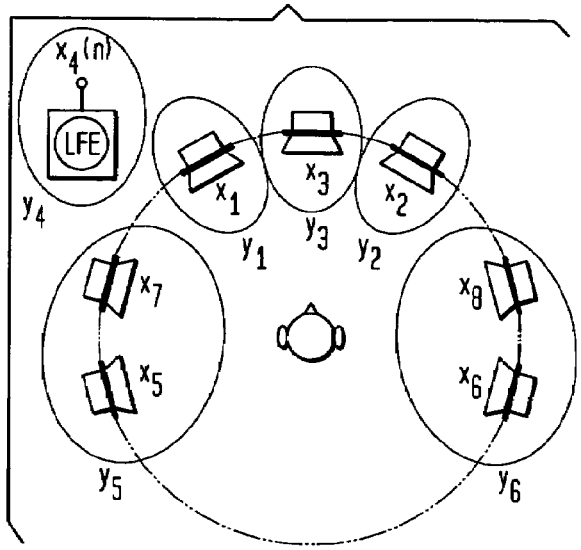
FIG. 9 represents one possible implementation of 7.1-to-5.1 BCC processing.

FIG. 9 represents one possible implementation of 7.1-to-5.1 BCC processing in which eight input channels $x_i(n)$ are downmixed to six transmitted channels $y_i(n)$, which are subsequently subjected to upmixing and BCC synthesis to form eight playback channels $\hat{x}_i(n)$, for the loudspeaker arrangement shown in FIG. 9A. This 7.1-to-5.1 BCC scheme can be used for 5.1-surround backwards compatible coding of 7.1-surround signals, such as those used in "Lexicon Logic 7 Surround."

In particular, FIG. 9A represents the downmixing scheme applied to the eight input channels $x_i(n)$ to generate the six transmitted channels $y_i(n)$, where the downmixing matrix $D_{86}$ used in Equation (1) is given by Equation (13) as follows:

$$D_{86} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 1 & 0 \\ 0 & 0 & 0 & 0 & 0 & 1 & 0 & 1 \end{bmatrix}, \quad (13)$$

where the three front channels 1, 2, and 3 and the LFE channel 4 are transmitted unmodified, and the four rear channels 5, 6, 7, and 8 are downmixed to two transmitted channels 5 and 6, for a total of six transmitted channels.

Figure 9B:
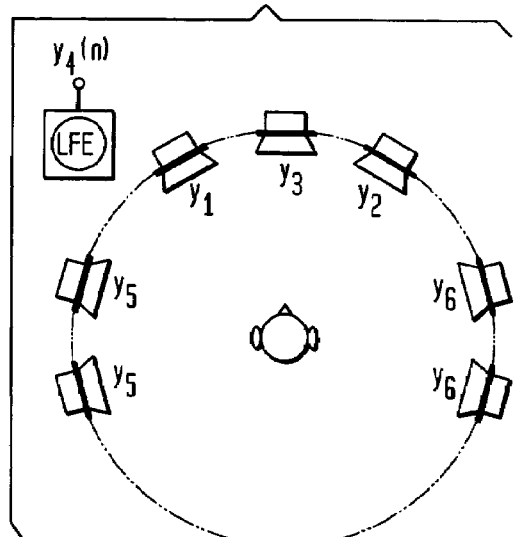

FIG. 9B represents the upmixing scheme applied to the six transmitted channels $y_i(n)$ to generate eight upmixed channels $\tilde{s}_i$, where the upmixing matrix $U_{68}$ used in Equation (4) is given by Equation (14) as follows:

$$U_{68} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 1 & 0 \\ 0 & 0 & 0 & 0 & 0 & 1 \end{bmatrix}. \quad (14)$$

In this case, the base channels for playback channels 1, 2, 3, 4, and 5 are transmitted channels 1, 2, 3, 4, and 5, respectively, while transmitted channel 5 is used as the base channel for both playback channels 5 and 7 and transmitted channel 6 is used as the base channel for both playback channels 6 and 8.

Figure 9C:
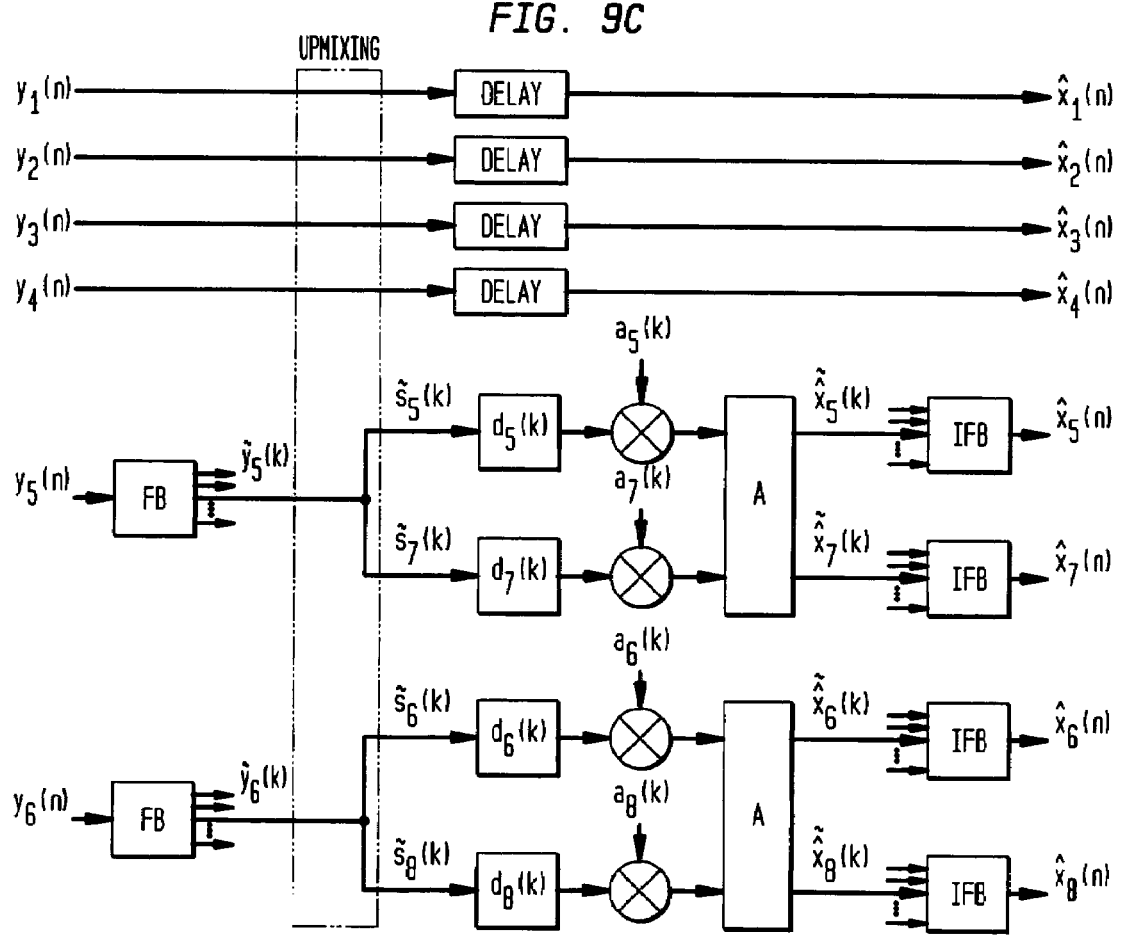

FIG. 9C shows the upmixing and BCC synthesis applied to the six transmitted channels at the decoder to generate the eight playback channels. Since transmitted channels 1, 2, 3, and 4 are unmodified, no forward and inverse filter banks are used for these channels, which are delayed to compensate for the BCC processing time of the other channels. In this implementation, ICTD, ICLD, and ICC synthesis is applied between the two playback rear left channels and between the two playback rear night channels. As such, the BCC code data can be limited to $\Delta L_{57}$, $\Delta L_{68}$, $\tau_{57}$, $\tau_{68}$, $c_{57}$, and $c_{68}$.

6.2-to-5.1 BCC Processing

Figure 10A:
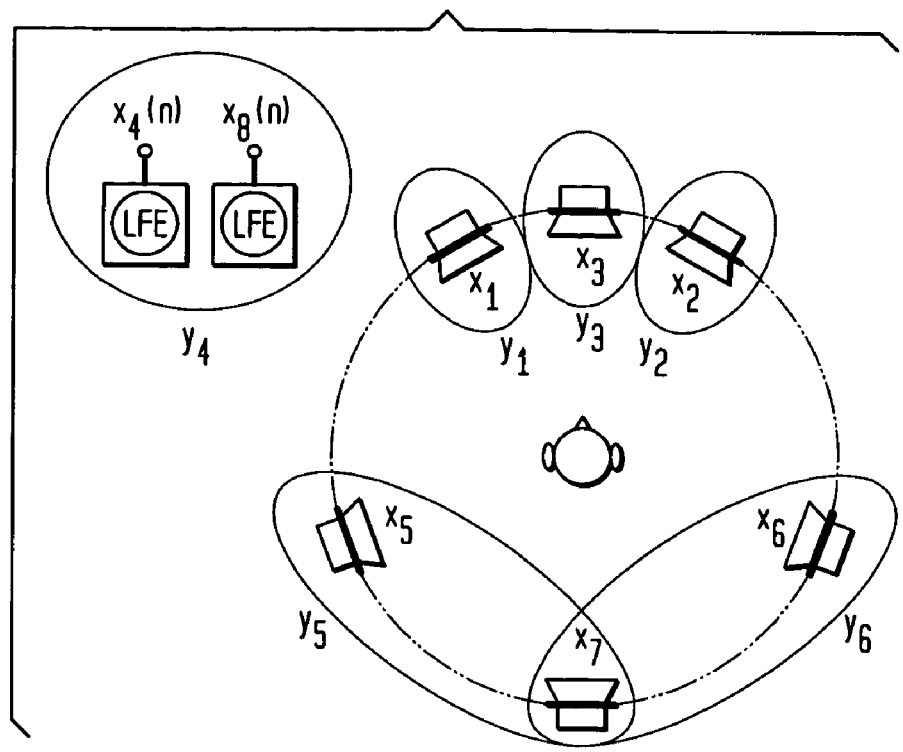
FIG. 10 represents one possible implementation of 6.2-to-5.1 BCC processing.
Figure 10B:
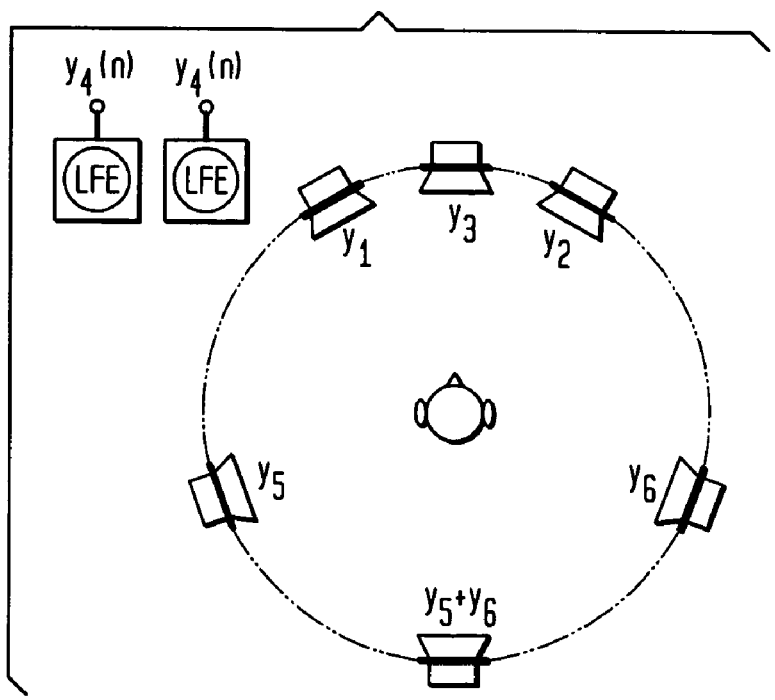
Figure 10C:
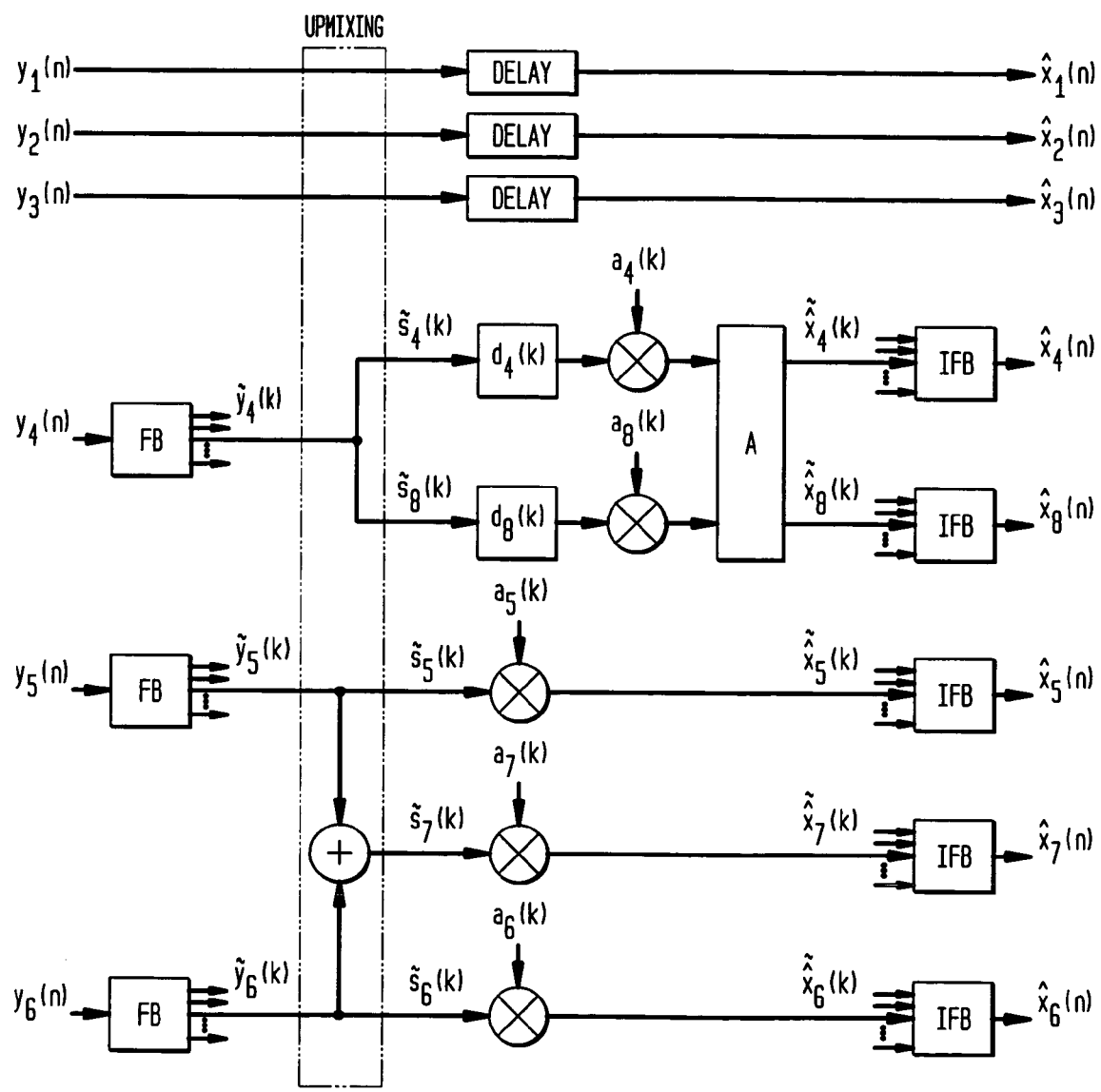

FIG. 10 represents one possible implementation of 6.2-to-5.1 BCC processing in which eight input channels $x_i(n)$ are downmixed to six transmitted channels $y_i(n)$, which are subsequently subjected to upmixing and BCC synthesis to form eight playback channels $\hat{x}_i(n)$, for the loudspeaker arrangement shown in FIG. 10A, where the "0.2" the presence of two LFE channels. This 6.2-to-5.1 BCC scheme can be used for 5.1-surround backwards compatible coding of 6.2-surround signals.

In particular, FIG. 10A represents the downmixing scheme applied to the eight input channels $x_i(n)$ to generate the transmitted channels $y_i(n)$, where the downmixing matrix $D_{86}$ used in Equation (1) is given by Equation (15) as follows:

$$D_{86} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 1 \\ 0 & 0 & 0 & 0 & 1 & 0 & \frac{1}{\sqrt{2}} & 0 \\ 0 & 0 & 0 & 0 & 0 & 1 & \frac{1}{\sqrt{2}} & 0 \end{bmatrix}, \quad (15)$$

where the three front channels 1, 2, and 3 are transmitted unmodified, and the three rear channels 5, 6, and 7 and the two LFE channels 4 and 8 are downmixed to three transmitted channels 4, 5, and 6, for a total of six transmitted channels.

FIG. 10B represents the upmixing scheme applied to the six transmitted channels $y_i(n)$ to generate eight upmixing channels $\tilde{s}_i$, where the upmixing matrix $U_{68}$ used in Equation (4) is given by Equation (16) as follows:

$$U_{68} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 1 & 1 \\ 0 & 0 & 0 & 1 & 0 & 0 \end{bmatrix}. \quad (16)$$

In this case, the base channels for playback channels 1, 2, 3, 5, and 6 are transmitted channels 1, 2, 3, 5, and 6, respectively, while transmitted channel 4 is used as the base channel for both playback LFE channels 4 and 8, and the sum of the left rear and right rear transmitted channels 5 and 6 is used as the base channel for the playback rear channel 7.

FIG. 9C shows the upmixing and BCC synthesis applied to the six transmitted channels at the decoder to generate the eight playback channels. Since transmitted channels 1, 2, and 3 are unmodified, no forward and inverse filter banks are used for these channels, which are delayed to compensate for the BCC processing time of the other channels. In this implementation, ICTD, ICLD, and ICC synthesis is applied between the two playback LFE channels, but no ICTD or ICC synthesis is applied to generate playback channels 5, 6, and 7. As such, the BCC code data can be limited to $\Delta L_{57}$, $\Delta L_{67}$, $\Delta L_{48}$, $\tau_{48}$, and $c_{48}$.

Alternative Embodiments

BCC processing has been described in the context of generic as well as a number of specific implementations. Those skilled in the art will understand that BCC processing can be extended to other specific implementations involving just about any combination of any numbers of non-LFE channels and/or any numbers of LFE channels.

Although the present invention has been described in the context of implementations in which the encoder receives input audio signal in the time domain and generates transmitted audio signals in the time domain and the decoder receives the transmitted audio signals in the time domain and generates playback audio signals in the time domain, the present invention is not so limited. For example, in other implementations, any one or more of the input, transmitted, and playback audio signals could be represented in a frequency domain.

BCC encoders and/or decoders may be used in conjunction with or incorporated into a variety of different applications or systems, including systems for television or electronic music distribution, movie theaters, broadcasting, streaming, and/or reception. These include systems for encoding/decoding transmissions via, for example, terrestrial, satellite, cable, internet, intranets, or physical media (e.g., compact discs, digital versatile discs, semiconductor chips, hard drives, memory cards, and the like). BCC encoders and/or decoders may also be employed in games and game systems, including, for example, interactive software products intended to interact with a user for entertainment (action, role play, strategy, adventure, simulations, racing, sports, arcade, card, and board games) and/or education that may be published for multiple machines, platforms, or media. Further, BCC encoders and/or decoders may be incorporated in audio recorders/players or CD-ROM/DVD systems. BCC encoders and/or decoders may also be incorporated into PC software applications that incorporate digital decoding (e.g., player, decoder) and software applications incorporating digital encoding capabilities (e.g., encoder, ripper, recoder, and jukebox).

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. An encoder-implemented method for encoding C input audio channels to generate E transmitted audio channels, the method comprising:
    providing two or more of the C input channels in a frequency domain;
    generating one or more cue codes for each of one or more different frequency bands in the two or more input channels in the frequency domain, wherein the one or more cue codes comprise inter-channel level difference (ICLD) data and inter-channel time difference (ICTD) data; and
    downmixing the C input channels to generate the E transmitted channels, where $C>E\geq 1$.

2. The invention of claim 1, further comprising formatting the E transmitted channels and the one or more cue codes into a transmission format such that:
    the format enables a first audio decoder having no knowledge of the existence of the one or more cue codes to generate E playback audio channels based on the E transmitted channels and independent of the one or more cue codes; and
    the format enables a second audio decoder having knowledge of the existence of the one or more cue codes to generate more than E playback audio channels based on the E transmitted channels and the one or more cue codes.

3. The invention of claim 2, wherein the format enables the second audio decoder to generate C playback audio channels based on the E transmitted channels and the one or more cue codes.

4. The invention of claim 1, wherein E=1.

5. The invention of claim 1, wherein E>1.

6. The invention of claim 1, wherein each of the E transmitted channels is based on two or more of the C input channels.

7. The invention of claim 1, wherein:
    at least one of the E transmitted channels is based on two or more of the C input channels; and
    at least one of the E transmitted channels is based on only a single one of the C input channels.

8. The invention of claim 7, wherein:
    the C input channels comprise a first low frequency effects (LFE) channel; and
    at least one of the E transmitted channels is based on only the first LFE channel.

9. The invention of claim 7, wherein:
    the C input channels comprise at least two LFE channels; and
    at least one of the E transmitted channels is based on the at least two LFE channels.

10. The invention of claim 1, wherein the one or more cue codes further comprise ICC data.

11. The invention of claim 1, wherein the downmixing comprises, for each of one or more different frequency bands, downmixing the two or more input channels in the frequency domain into one or more downmixed channels in the frequency domain.

12. The invention of claim 11, wherein the downmixing further comprises converting the one or more downmixed channels from the frequency domain into one or more of the transmitted channels in the time domain.

13. An audio coder for encoding C input audio channels to generate E transmitted audio channels, the audio coder comprising:
    means for providing two or more of the C input channels in a frequency domain;
    means for generating one or more cue codes for each of one or more different frequency bands in the two or more input channels in the frequency domain, wherein the one or more cue codes comprise ICLD data and ICTD data; and
    means for downmixing the C input channels to generate the E transmitted channels, where $C>E\geq 1$.

14. Apparatus for encoding C input audio channels to generate E transmitted audio channels, the apparatus comprising:
    two or more filter banks adapted to convert two or more of the C input channels from a time domain into a frequency domain;
    a code estimator adapted to generate one or more cue codes for each of one or more different frequency bands in the two or more converted input channels, wherein the one or more cue codes comprise ICLD data and ICTD data; and
    a downmixer adapted to downmix the C input channels to generate the E transmitted channels, where $C>E\geq 1$.

15. The invention of claim 14, wherein the apparatus is adapted to format the E transmitted channels and the one or more cue codes into a transmission format such that:
    the format enables a first audio decoder having no knowledge of the existence of the one or more cue codes to generate E playback audio channels based on the E transmitted channels and independent of the one or more cue codes; and
    the format enables a second audio decoder having knowledge of the existence of the one or more cue codes to generate more than E playback audio channels based on the E transmitted channels and the one or more cue codes.

16. The invention of claim 15, wherein the format enables the second audio decoder to generate C playback audio channels based on the E transmitted channels and the one or more cue codes.

17. The invention of claim 14, wherein E=1.

18. The invention of claim 14, wherein E>1.

19. The invention of claim 14, wherein each of the E transmitted channels is based on two or more of the C input channels.

20. The invention of claim 14, wherein:
    at least one of the E transmitted channels is based on two or more of the C input channels; and
    at least one of the E transmitted channels is based on only a single one of the C input channels.

21. The invention of claim 20, wherein:
the C input channels comprise a first LFE channel; and
at least one of the E transmitted channels is based on only the first LFE channel.

22. The invention of claim 20, wherein:
the C input channels comprise at least two LFE channels; and
at least one of the E transmitted channels is based on the at least two LFE channels.

23. The invention of claim 14, wherein the one or more cue codes further comprise ICC data.

24. The invention of claim 14, wherein the downmixer is adapted, for each of one or more different frequency bands, to downmix the two or more converted input channels into one or more downmixed channels in the frequency domain.

25. The invention of claim 24, further comprising one or more inverse filter banks adapted to convert the one or more downmixed channels from the frequency domain into one or more the transmitted channels in the time domain.

26. The invention of claim 14, wherein:
the apparatus is a system selected from the group consisting of a digital video recorder, a digital audio recorder, a computer, a satellite transmitter, a cable transmitter, a terrestrial broadcast transmitter, a home entertainment system, and a movie theater system; and
the system comprises the two or more filter banks, the code estimator, and the downmixer.

27. A decoder-readable storage medium comprising an encoded audio bitstream generated by encoding C input audio channels to generate E transmitted audio channels, wherein:
two or more of C input channels are provided in a frequency domain;
one or more cue codes are generated for each of one or more different frequency bands in the two or more input channels in the frequency domain, wherein the one or more cue codes comprise ICLD data and ICTD data;
the C input channels are downmixed to generate E transmitted channels, where $C > E \geq 1$; and
the E transmitted channels and the one or more cue codes are encoded into the encoded audio bitstream.

28. The invention of claim 27, the encoded audio bitstream has a transmission format such that:
the format enables a first audio decoder having no knowledge of the existence of the one or more cue codes to generate E playback audio channels based on the E transmitted channels and independent of the one or more cue codes; and
the format enables a second audio decoder having knowledge of the existence of the one or more cue codes to generate more than E playback audio channels based on the E transmitted channels and the one or more cue codes.

29. The invention of claim 28, wherein the format enables the second audio decoder to generate C playback audio channels based on the E transmitted channels and the one or more cue codes.

30. A decoder-readable storage medium comprising an encoded audio bitstream comprising E transmitted channels and one or more cue codes, wherein:
the one or more cue codes are generated by:
providing two or more of C input audio channels in a frequency domain; and
generating one or more cue codes for each of one or more different frequency bands in the two or more input channels in the frequency domain, wherein the one or more cue codes comprise ICLD data and ICTD data; and
the E transmitted channels are generated by downmixing the C input channels, where $C > E \geq 1$.

31. The invention of claim 30, the encoded audio bitstream has a transmission format such that:
the format enables a first audio decoder having no knowledge of the existence of the one or more cue codes to generate E playback audio channels based on the E transmitted channels and independent of the one or more cue codes; and
the format enables a second audio decoder having knowledge of the existence of the one or more cue codes to generate more than E playback audio channels based on the E transmitted channels and the one or more cue codes.

32. The invention of claim 31, wherein the format enables the second audio decoder to generate C playback audio channels based on the E transmitted channels and the one or more cue codes.

33. A decoder-implemented method for decoding E transmitted audio channels to generate C playback audio channels, the method comprising:
upmixing, for each of one or more different frequency bands, one or more of the E transmitted channels in a frequency domain to generate two or more of the C playback channels in the frequency domain, where $C > E \geq 1$;
applying one or more cue codes to each of the one or more different frequency bands in the two or more playback channels in the frequency domain to generate two or more modified channels, wherein the one or more cue codes comprise ICLD data and ICTD data; and
converting the two or more modified channels from the frequency domain into a time domain.

34. The invention of claim 33, further comprising, prior to upmixing, converting the one or more of the E transmitted channels from the time domain to the frequency domain.

35. The invention of claim 33, wherein $E=1$.

36. The invention of claim 33, wherein $E>1$.

37. The invention of claim 33, wherein each of the C playback channels is based on at least one of the E transmitted channels and at least one cue code.

38. The invention of claim 33, wherein:
at least one of the C playback channels is based on at least one of the E transmitted channels and at least one cue code; and
at least one of the C playback channels is based on only a single one of the E transmitted channels and independent of any cue codes.

39. The invention of claim 38, wherein:
the E transmitted channels comprise a first LFE channel; and
at least one of the C playback channels is based on only the first LFE channel and independent of any cue codes.

40. The invention of claim 38, wherein:
the E transmitted channels comprise a first LFE channel; and
at least two of the C playback channels are based on the first LFE channel and at least one cue code.

41. The invention of claim 33, wherein the one or more cue codes further comprise ICC data.

42. The invention of claim 33, wherein the upmixing comprises, for each of one or more different frequency bands, upmixing at least two of the E transmitted channels into at least one playback channel in the frequency domain.

43. An audio decoder for decoding E transmitted audio channels to generate C playback audio channels, the audio decoder comprising:

means for upmixing, for each of one or more different frequency bands, one or more of the E transmitted channels in a frequency domain to generate two or more of the C playback channels in the frequency domain, where $C > E \geq 1$;

means for applying one or more cue codes to each of the one or more different frequency bands in the two or more playback channels in the frequency domain to generate two or more modified channels, wherein the one or more cue codes comprise ICLD data and ICTD data; and means for converting the two or more modified channels from the frequency domain into a time domain.

44. An apparatus for decoding E transmitted audio channels to generate C playback audio channels, the apparatus comprising:

an upmixer adapted, for each of one or more different frequency bands, to upmix one or more of the E transmitted channels in a frequency domain to generate two or more of the C playback channels in the frequency domain, where $C > E \geq 1$;

a synthesizer adapted to apply one or more cue codes to each of the one or more different frequency bands in the two or more playback channels in the frequency domain to generate two or more modified channels, wherein the one or more cue codes comprise ICLD data and ICTD data; and one or more inverse filter banks adapted to convert the two or more modified channels from the frequency domain into a time domain.

45. The invention of claim 44, further comprising one or more filter banks adapted to convert, prior to the upmixing, the one or more of the E transmitted channels from the time domain to the frequency domain.

46. The invention of claim 44, wherein $E=1$.

47. The invention of claim 44, wherein $E>1$.

48. The invention of claim 44, wherein each of the C playback channels is based on at least one of the E input channels and at least one cue code.

49. The invention of claim 44, wherein:
at least one of the C playback channels is based on at least one of the E transmitted channels and at least one cue code; and
at least one of the C playback channels is based on only a single one of the E transmitted channels and independent of any cue codes.

50. The invention of claim 49, wherein:
the E transmitted channels comprise a first LFE channel; and
at least one of the C playback channels is based on only the first LFE channel and independent of any cue codes.

51. The invention of claim 49, wherein:
the E transmitted channels comprise a first LFE channel; and
at least two of the C playback channels are based on the first LFE channel and at least one cue code.

52. The invention of claim 44, wherein the one or more cue codes further comprise ICC data.

53. The invention of claim 44, wherein the upmixer is adapted, for each of one or more different frequency bands, to upmix at least two of the E transmitted channels into at least one playback channel in the frequency domain.

54. The invention of claim 44, wherein:
the apparatus is a system selected from the group consisting of a digital video player, a digital audio player, a computer, a satellite receiver, a cable receiver, a terrestrial broadcast receiver, a home entertainment system, and a movie theater system; and
the system comprises the upmixer, the synthesizer, and the one or more inverse filter banks.

55. An encoder-implemented method for encoding C input audio channels to generate E transmitted audio channels, the method comprising:

providing two or more of the C input channels in a frequency domain;

generating one or more cue codes for each of one or more different frequency bands in the two or more input channels in the frequency domain; and downmixing the C input channels to generate the E transmitted channels, where $C > E \geq 1$, wherein the downmixing comprises:
for each of one or more different frequency bands, downmixing the two or more input channels in the frequency domain into one or more downmixed channels in the frequency domain; and
converting the one or more downmixed channels from the frequency domain into one or more of the transmitted channels in the time domain.

56. Apparatus for encoding C input audio channels to generate E transmitted audio channels, the apparatus comprising:

two or more filter banks adapted to convert two or more of the C input channels from a time domain into a frequency domain;

a code estimator adapted to generate one or more cue codes for each of one or more different frequency bands in the two or more converted input channels;

a downmixer adapted to downmix the C input channels to generate the E transmitted channels, where $C > E \geq 1$, wherein the downmixer is adapted, for each of one or more different frequency bands, to downmix the two or more converted input channels into one or more downmixed channels in the frequency domain; and one or more inverse filter banks adapted to convert the one or more downmixed channels from the frequency domain into one or more the transmitted channels in the time domain.

* * * * *

UNITED STATES PATENT AND TRADEMARK OFFICE
CERTIFICATE OF CORRECTION

PATENT NO. : 7,644,003 B2 Page 1 of 1
APPLICATION NO. : 10/936464
DATED : January 5, 2010
INVENTOR(S) : Frank Baumgarte, Jiashu Chen and Christof Faller It is certified that error appears in the above-identified patent and that said Letters Patent is hereby corrected as shown below:

On the Title page, item (75); in the Inventors section, please replace "Jiashu Chen, Basking Ridge, NJ (US);" with --Jiashu Chen, Milpitas, CA (US);--.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,644,003 B2
APPLICATION NO. : 10/936464
DATED : January 5, 2010
INVENTOR(S) : Baumgarte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1509 days.

Signed and Sealed this

Twenty-first Day of December, 2010

David J. Kappos
*Director of the United States Patent and Trademark Office*